United States Patent
Dordoni et al.

(10) Patent No.: US 11,308,601 B2
(45) Date of Patent: Apr. 19, 2022

(54) CONTAINER INSPECTION SYSTEM WITH INDIVIDUAL LIGHT CONTROL

(71) Applicants: Joe Dordoni, Horseheads, NY (US); Richard D. Diehr, Horseheads, NY (US)

(72) Inventors: Joe Dordoni, Horseheads, NY (US); Richard D. Diehr, Horseheads, NY (US)

(73) Assignee: Emhart Glass S.A., Cham (CH)

(*) Notice: Subject to any disclaimer, the term of this patent is extended or adjusted under 35 U.S.C. 154(b) by 1367 days.

(21) Appl. No.: 15/130,523

(22) Filed: Apr. 15, 2016

(65) Prior Publication Data

US 2016/0321796 A1 Nov. 3, 2016

Related U.S. Application Data

(60) Provisional application No. 62/272,325, filed on Dec. 29, 2015, provisional application No. 62/154,508, filed on Apr. 29, 2015.

(51) Int. Cl.
*G06T 7/00* (2017.01)
*G01N 21/90* (2006.01)
(Continued)

(52) U.S. Cl.
CPC .......... *G06T 7/0004* (2013.01); *G01B 11/254* (2013.01); *G01B 11/2504* (2013.01);
(Continued)

(58) Field of Classification Search
CPC ........ G06T 7/0004; G06T 2207/30108; G01B 11/2504; G01B 11/254; G01N 21/8851;
(Continued)

(56) References Cited

U.S. PATENT DOCUMENTS 6,618,495 B1 * 9/2003 Furnas ................. G01N 21/90
209/526
7,120,284 B2 10/2006 Furnas
(Continued)

FOREIGN PATENT DOCUMENTS

EP 1 143 237 A1 10/2001
EP 1 498 725 A1 1/2005
(Continued)

OTHER PUBLICATIONS

Christian Von Ah; "inspection: Going Beyond Just Finding Defects" 65 Conference on Glass Problems: Ceramic Engineering and Science Proceedings, vol. 26, No. 1; Jan. 1, 2005; John Wiley & Sons, Inc. Hoboken, NJ, USA.

*Primary Examiner* — Joseph Suh
(74) *Attorney, Agent, or Firm* — Reinhart Boerner Van Deuren P.C.

(57) ABSTRACT

A system for inspecting a glass container and methods of inspecting glass containers are provided. The system includes a panel including a plurality of light sources configured to illuminate the glass container. The system includes a camera configured to image the illuminated glass container. The system includes a controller configured to adjust the amount of power applied to each of the light sources individually. The system includes a processor configured to evaluate the image of the illuminated glass container for indications of defects in the container. Methods of calibrating the system are also provided.

23 Claims, 22 Drawing Sheets

(51) Int. Cl.
  *G01L 1/24* (2006.01)
  *G01N 21/88* (2006.01)
  *H04N 5/232* (2006.01)
  *G01B 11/25* (2006.01)
  *H04N 5/225* (2006.01)
  *H04N 5/247* (2006.01)
  *H04N 17/00* (2006.01)

(52) U.S. Cl.
  CPC ............ *G01L 1/24* (2013.01); *G01N 21/8806* (2013.01); *G01N 21/8851* (2013.01); *G01N 21/9036* (2013.01); *H04N 5/2256* (2013.01); *H04N 5/232* (2013.01); *H04N 5/247* (2013.01); *H04N 17/002* (2013.01); *G01N 2021/8896* (2013.01); *G01N 2201/06146* (2013.01); *G06T 2207/30108* (2013.01)

(58) Field of Classification Search
  CPC ........... G01N 21/9036; G01N 21/8806; G01N 2201/06146; G01N 2021/8896; H04N 17/002; H04N 5/247; H04N 5/2256; H04N 5/23241; G01L 1/24
  See application file for complete search history.

(56) References Cited

U.S. PATENT DOCUMENTS

| | | | | |
|---|---|---|---|---|
| 7,551,274 | B1* | 6/2009 | Wornson | G01N 21/896 356/239.1 |
| 2004/0150815 | A1* | 8/2004 | Sones | G01N 21/9054 356/239.4 |
| 2005/0151979 | A1* | 7/2005 | Siekmeyer | G01B 11/24 356/625 |
| 2006/0256413 | A1* | 11/2006 | Kitamura | G03H 1/08 359/15 |
| 2008/0192897 | A1* | 8/2008 | Piorek | G01N 23/223 378/98.8 |
| 2010/0300856 | A1* | 12/2010 | Pance | H05B 33/086 200/314 |
| 2011/0036968 | A1* | 2/2011 | Errebo | H04N 1/401 250/205 |
| 2011/0309754 | A1* | 12/2011 | Ashdown | H05B 33/0818 315/151 |
| 2012/0293849 | A1* | 11/2012 | Nakajima | G02B 26/123 359/204.1 |
| 2013/0120557 | A1* | 5/2013 | King | G01N 21/8806 348/92 |
| 2013/0242085 | A1* | 9/2013 | Gut | G01N 21/9009 348/127 |
| 2013/0306729 | A1* | 11/2013 | Dilks | G01N 35/00732 235/455 |
| 2014/0119634 | A1* | 5/2014 | Numazu | G01N 21/90 382/142 |
| 2014/0174127 | A1* | 6/2014 | Dalstra | G01N 25/72 65/29.11 |
| 2015/0160134 | A1* | 6/2015 | Booker | G01N 21/645 702/104 |
| 2015/0172575 | A1* | 6/2015 | Adachi | H04N 5/2354 348/239 |
| 2015/0181184 | A1* | 6/2015 | Kwon | H04N 5/74 348/745 |
| 2015/0317816 | A1* | 11/2015 | Bendall | G01B 21/04 345/419 |
| 2015/0324566 | A1* | 11/2015 | Miura | G06K 9/0004 726/19 |
| 2016/0166193 | A1* | 6/2016 | Lin | A61B 5/4064 600/301 |
| 2016/0202413 | A1* | 7/2016 | Choraku | G02B 6/12002 385/14 |
| 2017/0082522 | A1* | 3/2017 | Tan | G01N 21/958 |
| 2017/0294063 | A1* | 10/2017 | Hodge | G07C 9/00158 |
| 2017/0302840 | A1* | 10/2017 | Hasinoff | H04N 1/2137 |
| 2017/0353703 | A1* | 12/2017 | Guo | H04N 9/3141 |
| 2018/0143143 | A1* | 5/2018 | Coetzee | G01N 21/9027 |
| 2018/0164224 | A1* | 6/2018 | Jiang | G01N 21/8901 |
| 2018/0209918 | A1* | 7/2018 | Tarantino | G01N 21/958 |

FOREIGN PATENT DOCUMENTS

| | | |
|---|---|---|
| JP | 2001-356097 A | 12/2001 |
| JP | 2004-184241 A | 4/2004 |
| JP | 2005-043358 A | 2/2005 |
| JP | 2005-303233 A | 10/2005 |
| JP | 2008-304487 A | 12/2008 |
| JP | 2009-222728 A | 10/2009 |

* cited by examiner

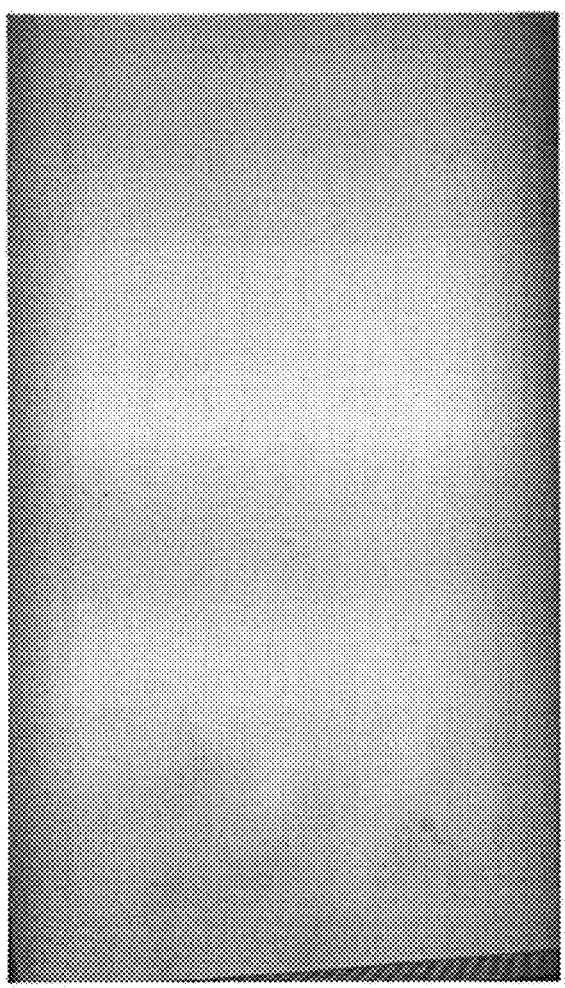
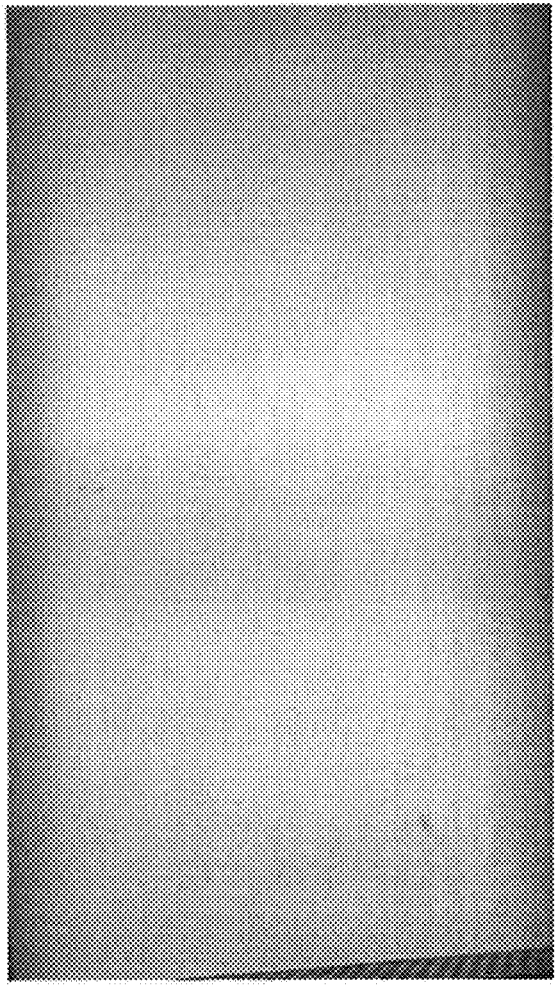
FIG. 19                    FIG. 20

CONTAINER INSPECTION SYSTEM WITH INDIVIDUAL LIGHT CONTROL

CROSS-REFERENCE TO RELATED PATENT APPLICATIONS

This patent application claims the benefit of U.S. Provisional Patent Application No. 62/154,508, filed Apr. 29, 2015 and U.S. Provisional Patent Application No. 62/272,325, filed Dec. 29, 2015, the entire teachings and disclosure of which are incorporated herein by reference thereto.

FIELD OF THE INVENTION

The present invention relates generally to machines that inspect glass containers such as bottles for defects, and more particularly to a glass container inspection system with individual light control.

BACKGROUND OF THE INVENTION

Glass containers may be made in a manufacturing process that has three parts, namely the batch house, the hot end, and the cold end. The batch house is where the raw materials for glass (which may typically include sand, soda ash, limestone, cullet (crushed, recycled glass), and other raw materials) are prepared and mixed into batches. The hot end begins with a furnace, in which the batched materials are melted into molten glass, and from which a stream of molten glass flows.

The molten glass is cut into cylinders of glass called gobs, which fall by gravity into blank molds. In the blank molds, a pre-container referred to as a parison is formed, either by using a metal plunger to push the glass into the blank mold, or by blowing the glass from below into the blank mold. The parison is inverted and transferred to a mold, where the parison is blown out into the shape of the container. The hot end also includes an annealing process which prevents the containers from having weakened glass caused by stresses caused by uneven cooling. The annealing process is used to achieve even cooling by using an annealing oven or Lehr to heat the containers, and then slowly cooling the containers over a twenty to sixty minute period.

The glass containers may be inspected in the cold end to ensure that they are of acceptable quality. This inspection of the glass containers may be accomplished by a variety of automated machines for a variety of faults, such as, for example, small cracks in the glass referred to as checks, foreign inclusions referred to as stones, bubbles in the glass referred to as blisters, excessively thin walls, bird swings, seeds, dirt, fused glass, mold dope, large soft-edge blisters, ribbon tears, loading marks, heavy washboard, blow-outs, stones causing stress, viscous knots and dissimilar materials, no annealing, container lean, bent neck, sunken body, chips, lineovers, finish blisters, overpress, plunger pulls, dirt, deep or damaged baffles, tramp glass, filler offset, etc.

Additionally, inspection may be performed at high speed, for example, at an inspection rate of approximately the sealing surface image 200 to 1000 glass containers per minute.

In some inspection systems, the glass container passes through an inspection location where a camera takes one or more images of the glass container. The images are then analyzed to determine if a defect exists in the glass container.

To improve the images, a illumination device illuminates the glass container within the inspection location to accentuate defects in the glass container in the images that are taken by the camera.

One particular illumination device used in glass container inspection is a panel of LED lights arranged in a grid of LED lights. To provide a more uniform light being directed toward the glass container within the inspection location, LEDs that are further from a center of the grid of LED lights are angled towards the center such that the light emitted thereby of is better directed towards the inspection location. The further the LED is from the center of the grid, the more angle with which the LED is mounted. This is because light sources located at different locations on the panel are different distances from the camera and emit light at different angles relative to the axis of inspection of the camera. If a light source is viewed off of its central axis from a single point, for example, the axis of observation of the camera, the light intensity drops as the angle is increase.

Unfortunately, building panels of this nature is very timely and expensive due to the various angles at which the LEDs are to be mounted to an underlying board. Further yet, complex fixtures are required to facilitate manufacture of these panels.

Further, different defect inspections use different light intensities and shapes to emphasize different glass container defects. Unfortunately, prior panels have limited flexibility in the ability to modify the intensity of the light source. Similarly, different glass containers may have different shapes which require different illumination patters and intensity to improve defect detection by the cameras.

Further, LEDs that are manufactured often, due to material variations, etc., will emit different intensities of light under the same conditions, e.g., same power, current, voltage, etc. Not only will they be manufactured with different light emission intensities, but over time the LEDs within a panel will degrade at different rates. Unfortunately, if individual LEDs are replaced, the new LEDs may have a different intensity than older LEDs that are not yet worn out. This creates difficult issues in determining maintenance intervals for the LEDs in the panels. Not only will the LEDs vary intensity, debris that is deposited onto the LEDs will also affect the intensity of individual LEDs and this will provide further variations in the intensity of light for different portions of the panel.

There is therefore a need in the art for an improved light source for inspecting glass containers.

BRIEF SUMMARY OF THE INVENTION

One embodiment of the invention relates to a system for inspecting a glass container. The system includes an illumination device in the form of a panel. The panel includes a plurality of light sources configured to illuminate the glass container. The system includes a camera. The camera is configured to image the illuminated glass container. The system includes a controller. The controller is configured to adjust the amount of power applied to each of the light sources individually. The system includes a processor. The processor is configured to evaluate the image of the illuminated glass container for indications of defects in the container.

In one embodiment, each light source is one or more surface mounted LEDs. In an alternative embodiment, each light sources is one or more through hole mounted LEDs.

In one embodiment, the panel is configured to illuminate the plurality of light sources simultaneously. This may be done without a glass container in the field of view of the camera. The processor is configured to evaluate an image of the panel. The controller is configured to control the power supplied to each of the plurality of light sources individually such that an image of the panel appears to be uniformly lit to the camera without the glass container in the field of view of the camera.

In one embodiment, the controller is configured to illuminate selected ones of the plurality of light sources to illuminate in a predetermined illumination pattern.

In one embodiment, the processor is configured to evaluate an output from the camera to determine if the brightness detected in a field of view of the camera is below a predetermined threshold and to indicate to the controller when the brightness detected in a field of view of the camera is below the predetermined threshold.

In one embodiment, the controller is configured to receive the indication that the brightness detected in the field of view of the camera is below a predetermined threshold and to adjust the amount of power supplied to at least one of the plurality of light sources until a desired brightness is detected.

In one embodiment, all of the light sources of the panel are directed in a same orientation. In a more particular embodiment, all of the light sources are directed parallel to one another.

In one embodiment, light sources that are farther from the inspection axis of the camera are driven at a higher power than light sources that are closer to the inspection axis of the camera such that the brightness of the farther and closer light sources is the same as viewed by the camera.

In one embodiment, the controller is configured to illuminate the light sources based on a plurality of predetermined patterns depending on a type of container inspection. Each predetermined pattern having a corresponding power table.

In one embodiment, the controller and processor are configured to test the brightness of the light sources to determine power adjustment values based on a captured image of the panel. The controller and processor are configured to adjust the power table for one or more of the predetermined patterns based on the power adjustment values.

In one embodiment, the image of the glass container is captured when the glass container is off of an inspection axis of the camera (also referred to as a central axis of the camera). The controller is configured to adjust the power of the plurality of light sources as if the image was captured when the glass container was on the inspection axis of the camera.

The panel may be formed from a plurality of panel segments and the panel need not be planar or formed as a single continuous unit but could be a plurality of combined segments and the segments need not be planar.

In one embodiment, the system includes a second camera. An inspection axis of the first camera is offset from an inspection axis of the second camera.

In one embodiment, the inspection axis of the first camera is angled relative to the inspection axis of the second camera.

In one embodiment, the inspection axis of the first camera is orthogonal to a portion of the panel where the inspection axis of the first camera intersects the panel.

In one embodiment, the panel is planar.

In one embodiment, the panel is formed from a plurality of segments that are non-parallel to one another.

In an embodiment, a method of inspecting a glass container is provided. The method uses a first panel including a first plurality of light sources. The method includes illuminating a first predetermined set of the first plurality of light sources to illuminate the glass container with a first predetermined illumination pattern. The method includes capturing a first image of the illuminated glass container. The method includes illuminating a second predetermined set of the first plurality of light sources to illuminate the glass container with a second predetermined illumination pattern. The second predetermined illumination pattern is different from the first predetermined illumination pattern. The method includes capturing a second image of the illuminated glass container using the illumination of the second illumination pattern. The method includes evaluating the first and second images to determine whether the glass container includes a defect.

In one embodiment, the method includes illuminating all of the first plurality of light sources, evaluating the brightness of the image viewed by a first camera, and individually adjusting the amount of power supplied to at least one of the first plurality of light sources to provide uniform illumination from the view of the first camera.

In one embodiment, the method includes continuing to evaluate the brightness of a field of view viewed by a first camera and increasing the amount of power supplied to at least one of the plurality of light sources if the brightness of the field of view viewed by the first camera drops below a predetermined threshold.

In one embodiment, the first image is captured by a first camera and the second image is captured by a second camera.

In one embodiment, an inspection axis of the first camera is offset from an inspection axis of the second camera.

In one embodiment, the inspection axis of the first camera is angled relative to the inspection axis of the second camera.

In one embodiment, the inspection axis of the first camera is orthogonal to a portion of the panel where the inspection axis of the first camera intersects the panel.

In one embodiment, the first and second images are captured by a first camera.

In one embodiment, one of the first and second predetermined illumination patterns is a uniform background for inspecting opaque defects while the other one of the second and first predetermined patterns provides a high contrast for highlighting the edges of a container for dimensional inspection.

In one embodiment, the first image is captured with the glass container located in a first location relative to the panel and the second image is captured with the glass container positioned in a second location relative to the panel, the second location being different than the first location.

In a more particular embodiment, the first and second images are captured by a same camera.

In one embodiment, the step of illuminating a first predetermined set of the first plurality of light sources includes powering the first predetermined set of the first plurality of light sources based on a first predetermined power table. The step of illuminating a second predetermined set of the first plurality of light sources includes powering the second set of the first plurality of light sources based on a second predetermined power table.

In one embodiment, the method includes analyzing the brightness of the first plurality of light sources and determining a brightness adjustment value for at least one of the first plurality of light sources. The method includes creating a calibration table that stores the brightness adjustment value for the at least one of first plurality of light sources. The method includes adjusting the first and second predetermined power tables based on the calibration table. These adjusted power tables can then be used to power the panel.

In one embodiment, illuminating a first predetermined set of the first plurality of light sources includes powering the first predetermined set of the first plurality of light sources based on a first predetermined power table. The method further includes analyzing the brightness of the first predetermined set of first plurality of light sources and determining a brightness adjustment value for at least one of the light sources of the first predetermined set. The method further includes adjusting the first power table based on the brightness adjustment value for the at least one of the light sources of the first predetermined set. These adjusted power tables can then be used to power the panel.

In one embodiment, the first and second predetermined illumination patterns are selected from one of a plurality of horizontal bands of light; a plurality of vertical bands of light; a uniform continuous light; a shape that follows the contour of the glass container; and a circle.

In one embodiment, the panel is planar.

In one embodiment, the panel is formed from a plurality of segments that are non-parallel to one another.

In an embodiment, a method of operating a system for inspecting glass containers is provided. The system for inspecting glass containers includes a panel including a plurality of light sources configured to illuminate the glass container. A camera is configured to image the illuminated glass container. A controller is configured to control the amount of power supplied to each of the individual light sources individually. A processor is configured to evaluate the image of the illuminated glass container for indications of defects in the container. The method includes illuminating each of the plurality of light sources of the panel simultaneously with a known power which will typically be a same power. The method includes taking an image of the panel with the camera. The method includes evaluating the brightness of the image of the panel to determine if all of the light sources appear as illuminating at an expected brightness, which will typically be a uniform brightness, to the camera. The method includes determining a brightness adjustment value necessary for at least one of the light sources to make the panel appear as illuminating at the expected brightness, and typically, an uniform brightness, to the camera.

In one embodiment, the method includes creating a calibration table that stores the brightness adjustment value for the at least one of the light sources.

In one embodiment, the method further includes illuminating a predetermined pattern of the light sources wherein less than all of the light sources are to appear at a same brightness to the camera while inspecting a glass container.

In one embodiment, illuminating a predetermined pattern of the light sources includes applying the calibration table to the predetermined pattern to adjust the brightness of individual ones of the light sources based on the brightness values stored in the calibration table.

In one embodiment, the method includes adjusting a power supplied to individual ones of the light sources using the brightness adjustment value.

In one embodiment, the step of adjusting a power supplied to individual ones of the light sources includes increasing the power for light sources that have a brightness that is too low and decreasing the power for light sources that have a brightness that is too high.

In one embodiment, the method includes illuminating the plurality of light sources of the panel simultaneously with a predetermined power, which will typically be a same power for each of the plurality of light sources, a second time. The method includes taking a second image of the panel with the camera. The method includes evaluating the brightness of the second image of the panel to determine if all of the light sources appear as expected and typically, as illuminating at a uniform brightness to the camera. The method includes determining a second brightness adjustment value necessary for at least one of the light sources to make the panel appear as expected, typically, as illuminating at a uniform brightness to the camera. The method includes creating an updated calibration table based on the second brightness adjustment value.

In an embodiment, a method of operating a system for inspecting glass containers is provided. The system for inspecting glass containers includes a panel including a plurality of light sources configured to illuminate the glass container. The system includes a camera configured to image the illuminated glass container. The system includes a controller configured to adjust the amount of power supplied to each of the light sources individually. The system includes a processor configured to evaluate the image of the illuminated glass container for indications of defects in the container. The method includes illuminating a set of the plurality of light sources of the panel for a predetermined pattern based on an initial power table providing a power value for each of the plurality of light sources. The method includes capturing an image of a glass container with the camera with the predetermined pattern illuminated based on the initial power table. The method includes evaluating a quality of the image of the glass container for performing a predetermined inspection. The method includes adjusting at least one power value of the predetermined power table to adjust the brightness of at least one of the light sources to improve image quality for the predetermined inspection.

In one embodiment, the method includes determining a brightness adjustment value necessary for at least one of the light sources to make the set of the plurality of light sources appear as illuminating at a uniform brightness to the camera.

In one embodiment, the step of determining a brightness adjustment value includes: illuminating the plurality of light sources of the panel simultaneously with a same power; taking an image of the panel with the camera; evaluating the brightness of the image of the panel to determine if all of the light sources appear as illuminating at the uniform brightness to the camera; and determining the brightness adjustment value necessary for at least one of the light sources to make the panel appear as illuminating at a uniform brightness to the camera.

In one embodiment, the brightness adjustment value compensates for the image being off of the central axis of the camera.

In one embodiment, the step of adjusting at least one power value uses the brightness adjustment value to adjust the power value of at least one of the light sources.

In one embodiment, the predetermined inspection analyzes at least one component of the peripheral shape of the glass container and adjusting the at least one power value of the predetermined power table improves edge detection of a portion of the glass container defining the at least one component of the peripheral shape being inspected.

In one embodiment, the predetermined inspection analyzes the glass container for opaque defects and adjusting the at least one power value of the predetermined power table reduces washout.

In one embodiment, the predetermined inspection analyzes the glass container for stress defects and adjusting the at least one power value of the predetermined power table reduces stray reflections. These stray reflections could be generated by portions of the container that change directions, such as for example, shoulders that transition between a body portion and a neck region.

In one embodiment, adjusting the at least one power value of the predetermined power table reduces or increases the power supplied to at least one of the light sources to compensate for changes in wall thickness for different portions of the glass container.

In one embodiment, adjusting the at least one power value of the predetermined power table reduces or increases the power supplied to at least one of the light sources compensates for different light transmission characteristics in different portions of the glass container.

BRIEF DESCRIPTION OF THE DRAWINGS

This application will become more fully understood from the following detailed description, taken in conjunction with the accompanying figures, wherein like reference numerals refer to like elements in which:

FIG. 19 is a camera image of the light panel of FIG. 5 with contaminants preventing a portion of the light from the light panel from reaching the camera according to an exemplary embodiment.

FIG. 20 is a camera image of the light panel of FIG. 19 with the brightness of the LEDs increased to compensate for the contaminants according to an exemplary embodiment.

DETAILED DESCRIPTION OF THE INVENTION

Figure 1:
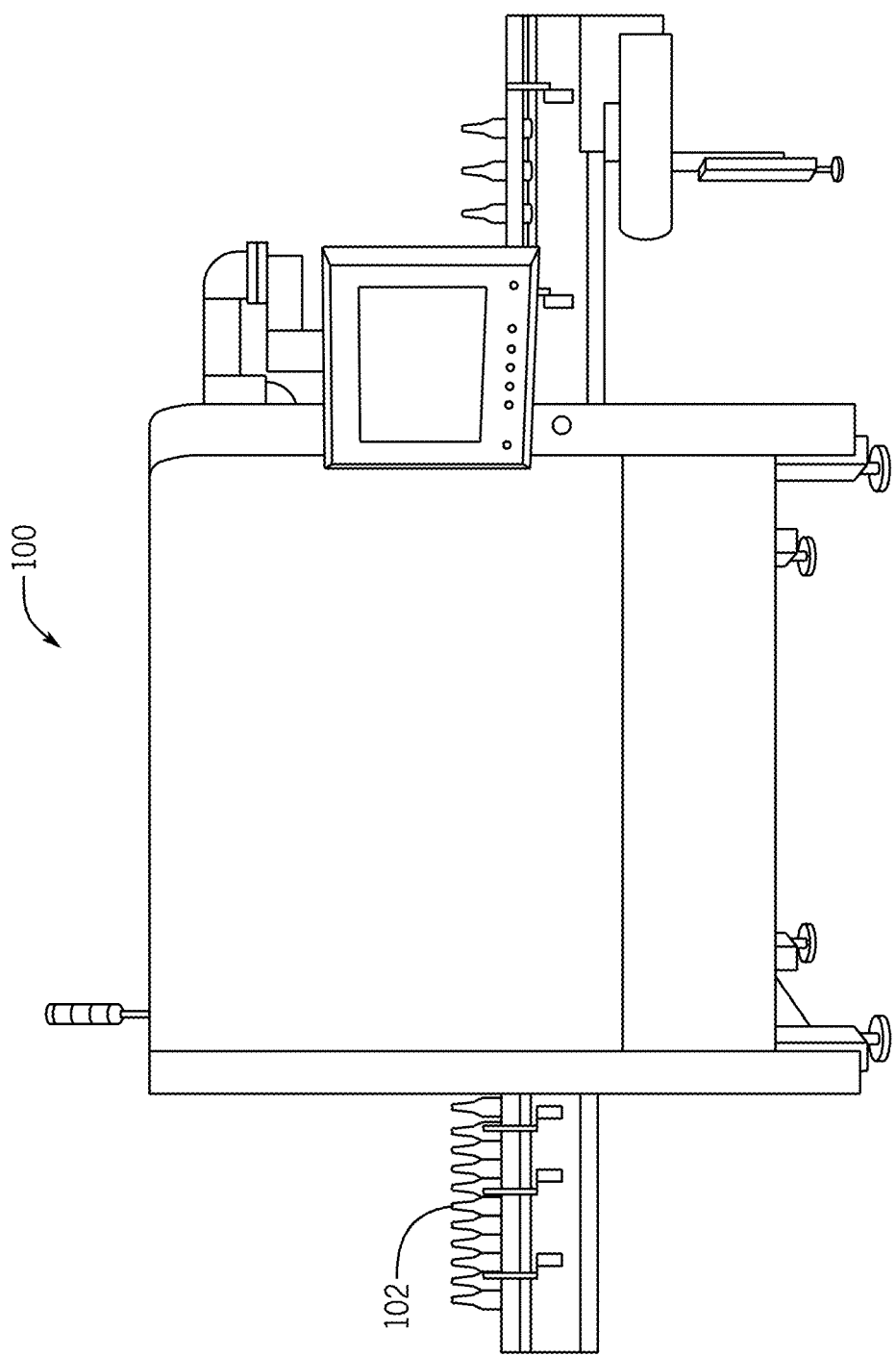
FIG. 1 is a perspective view of a glass container inspection system according to an exemplary embodiment.

Referring to the figures generally, glass containers, e.g., bottles, that have been formed are inspected for defects. Panels, each including pluralities of light sources, such as one or more light-emitting diodes (LEDs), are used to illuminate the glass containers. While some panels may be planar in nature, a panel need not be a planar device but could be curved or formed from a plurality of planar segments oriented relative to one another in a non-planar configuration. Images of the illuminated containers are taken by cameras. In various embodiments, glass container inspection systems use algorithms to determine whether each glass container includes a defect based on the images of the illuminated containers. A processor will analyze the images of the glass containers for indications of defects such as improper dimensions, cracks, inclusions or other deformities. This information can then be used to determine whether the glass container should be discarded or allowed to transition to downstream processes.

Light sources located at different locations on each panel are different distances from the camera and emit light at different angles relative to the axis of inspection of the camera. Therefore, by individually adjusting the intensity of each of the light sources, the camera can capture a uniform image without adjusting LED placement or configuration relative to the camera or including lenses to direct light from each light source toward the viewing axis of the camera (e.g., if a light source is viewed off of its central axis from a single point, for example, the axis of observation of the camera, the light intensity drops as the angle is increased). Thus, by individually adjusting the intensity of light emission from each light source, a uniform image can be perceived from any arbitrary viewing angle.

Additionally, LEDs that are manufactured often, due to material variations, etc., will emit different intensities of light under the same conditions, e.g., same power, current, voltage, etc. Therefore, by individually controlling the power, current, voltage, etc., supplied to each of the LEDs and thereby individually controlling the intensity of each of the LEDs, a uniform image is able to be achieved despite variations in LEDs.

Additionally, over time LED intensity (e.g., intensity at a given power, voltage, current, etc.) may deteriorate, and may deteriorate inconsistently among the LEDs of a panel of LEDs. Individually controlling each of the LEDs of the panel allows for compensation for deterioration of intensity of the LEDs. Moreover, the intensity of each of the LEDs may vary over time due to contamination in the light path between the LED, the glass container, and the camera. Individually controlling each of the LEDs of the panel allows for compensation for contamination in the light path between each LED, the glass container, and the camera.

Additionally, many different inspections may performed on glass containers, e.g., inspections which may be performed by illuminating different portions of the glass container to inspect for different types of defects, to inspect different portions of each container for defects, etc. Additionally, many different types, shapes, sizes, etc., of containers may be produced. Different illumination patterns may be needed to inspect these different types, shapes, sizes, etc., of containers. By individually controlling each of the LEDs of the panel, different inspections can be performed on different types, shapes, sizes, etc., of glass containers using the same panel of LEDs.

Additionally, some glass containers may have different light transmission characteristics in different portions of the glass containers. For example, glass containers have portions that are thicker or thinner than other portions. Container shape, embossing, color variations, etc., may have an effect on light transmission through the bottle. Therefore, by individually controlling LEDs of a panel of LEDs illuminating the glass container, an image of the glass container may be optimized to account for the variations in light transmission characteristics over the glass container.

With reference to FIG. 1, an embodiment of a container inspection system 100 is illustrated. Glass containers 102 enter the container inspection system 100 to be inspected for defects. The container inspection system 100 prevents ambient light from affecting inspection of the containers 102.

Figure 2:
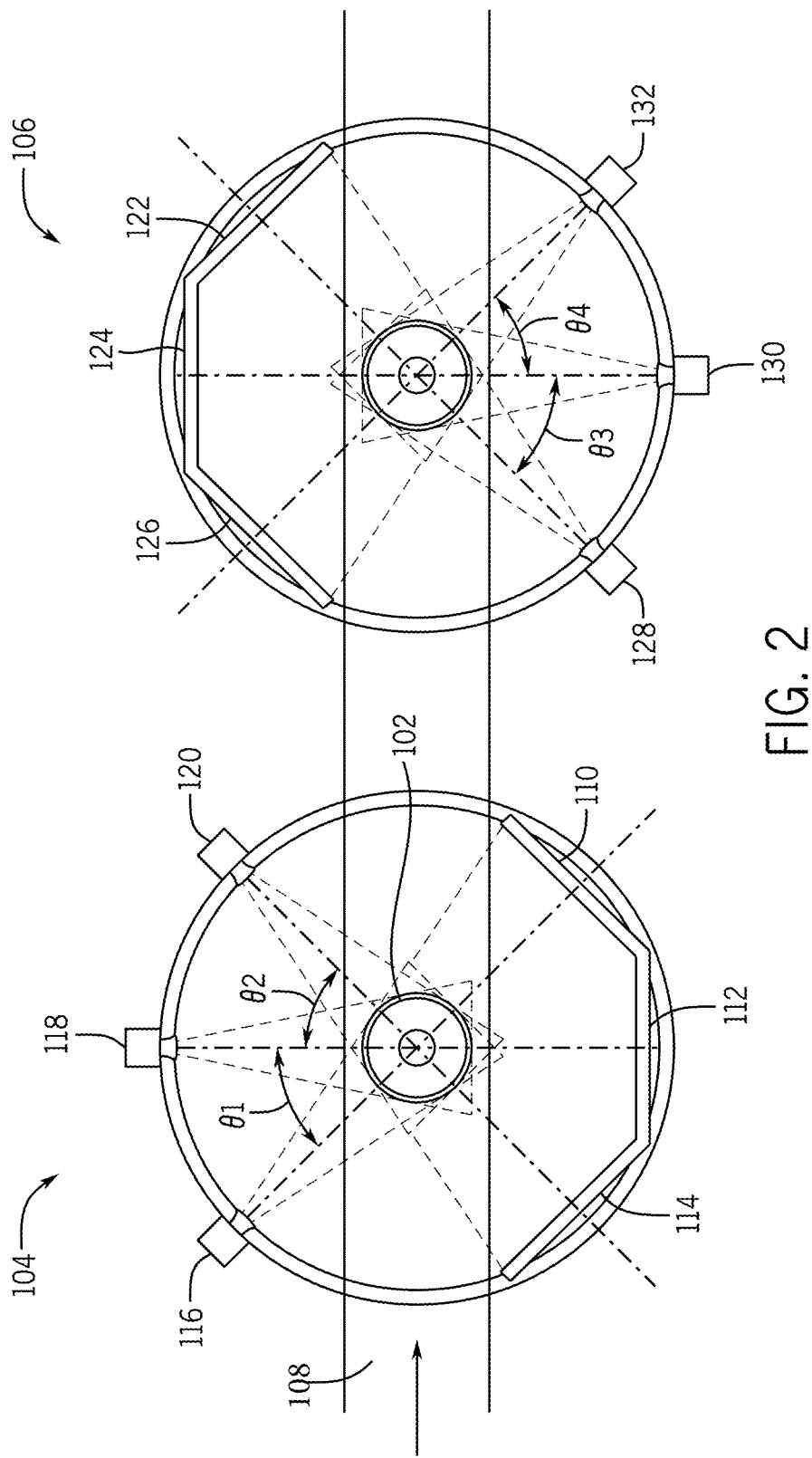
FIG. 2 schematically illustrates two inspection stations of the glass container inspection system of FIG. 1 according to an exemplary embodiment.

With reference to FIG. 2, in one embodiment, the inspection system includes two inspection stations 104 and 106. However, other embodiments, may incorporate more than two inspection stations or only a single inspection station. Glass containers 102 are conveyed by a conveyor 108 to the first station 104 in the inspection system 100. The first station 104 includes a first panel of light sources 110, a second panel of light sources 112, and a third panel of light sources 114. While identified as first, second and third panels of light sources 110, 112, 114, these identified panels can be considered a single panel and all of them could be used to some extent during a single inspection depending on the desired lighting of a container being inspected. However, for simplicity in this description each section will be referred to as an individual panel. The first station 104 also includes a first camera 116 located on the opposite side of the glass container 102 from the first panel of light sources 110, a second camera 118 located on the opposite side of the glass container 102 from the second panel of light sources 112, and a third camera 120 located on the opposite side of the glass container 102 from the third panel of light sources 114. The axis of inspection of the first camera 116 is an angular distance $\theta 1$ from the axis of inspection of the second camera 118. In one embodiment, $\theta 1$ is between 15° and 60°. In another embodiment, $\theta 1$ is 45°. The axis of inspection of the second camera 118 is an angular distance $\theta 2$ from the axis of inspection of the third camera 120. In one embodiment, $\theta 2$ is between 15° and 60°. In another embodiment, $\theta 2$ is 45°. These angles are representative only and other angles are contemplated. Further, other embodiments may use more or fewer cameras and/or panels.

With further reference to FIG. 2, in one embodiment, the conveyor 108 is configured to convey the container 102 from the first station 104 to the second station 106. The second station 106 includes a first panel of light sources 122, a second panel of light sources 124, and a third panel of light sources 126. While identified as first, second and third panels of light sources 110, 112, 114, these identified panels can be considered a single panel and all of them could be used to some extent during a single inspection depending on the desired lighting of a container being inspected. However, for simplicity in this description each section will be referred to as an individual panel. The second station 106 also includes a first camera 128 located on the opposite side of the glass container 102 from the first panel of light sources 122, a second camera 130 located on the opposite side of the glass container 102 from the second panel of light sources 124, and a third camera 132 located on the opposite side of the glass container 102 from the third panel of light sources 126. The axis of inspection of the first camera 128 is an angular distance $\theta 3$ from the axis of inspection of the second camera 130. In one embodiment, $\theta 3$ is between 15° and 60°. In another embodiment, $\theta 3$ is 45°. The axis of inspection of the second camera 130 is an angular distance $\theta 4$ from the axis of inspection of the third camera 132. In one embodiment, $\theta 4$ is between 15° and 60°. In another embodiment, $\theta 4$ is 45°. These angles are representative only and other angles are contemplated. Further, other embodiments may use more or fewer cameras and/or panels.

Figure 3:
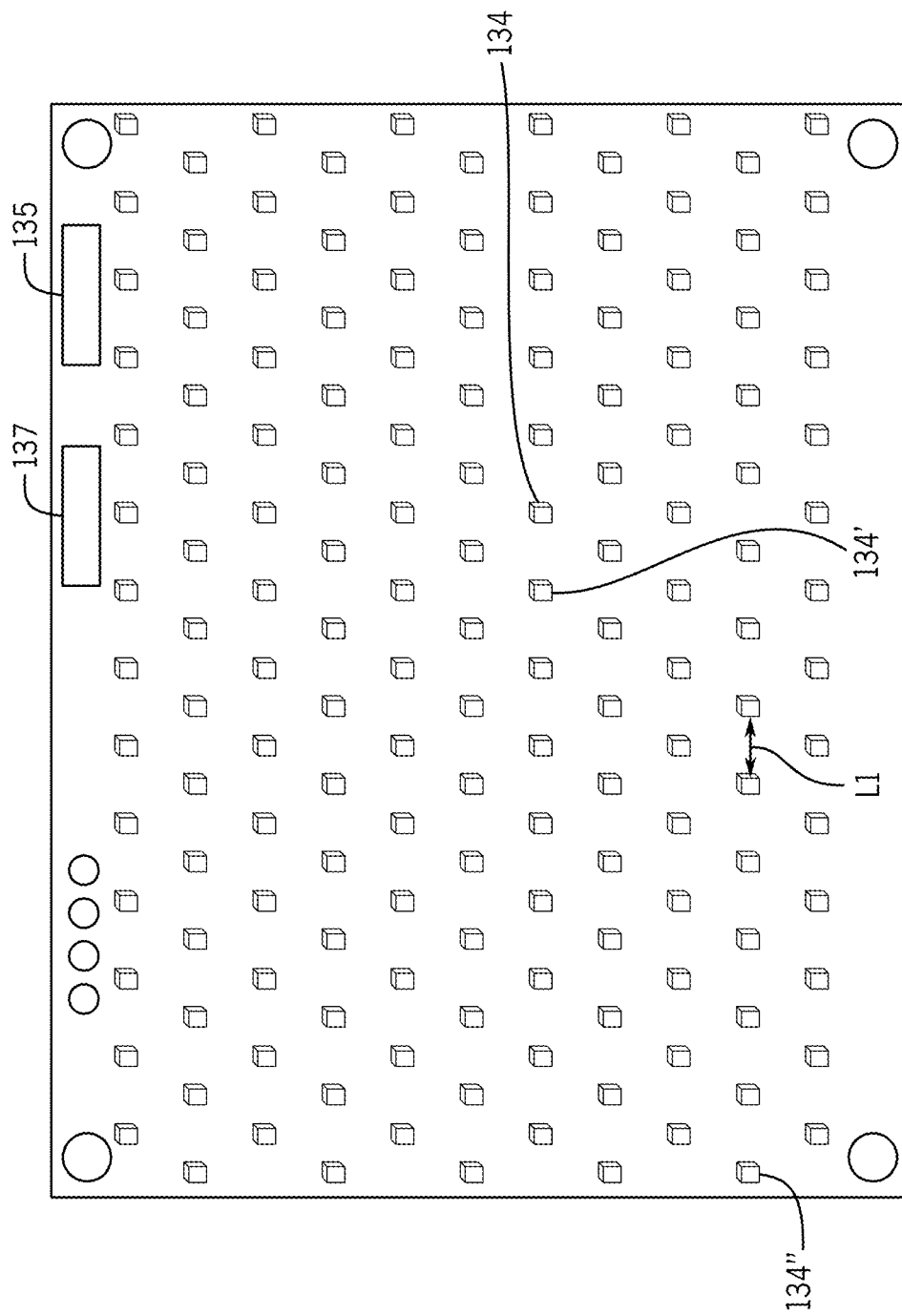
FIG. 3 is a front view of a light panel of an inspection station of FIG. 2 according to an exemplary embodiment.

With reference to FIG. 3, an embodiment of the first panel 110 of light sources is illustrated schematically. In one embodiment, the panels 112, 114, 122, 124, and 126 are similar to the first panel 110. The panel 110 includes a plurality of light sources shown as surface mount LEDs 134, 134', 134" (not all LEDs labelled with reference numbers for clarity). Each of the LEDs 134 is spaced apart from the other LEDs by a distance L1. In one embodiment, the distance L1 is between approximately 5 millimeters and 50 millimeters. In another embodiment, the distance L1 is approximately 15 millimeters. While each light source is shown schematically as a single surface mount LED, in some embodiments, a plurality of surface mount LEDs may be grouped together to form a single light source.

Further, other embodiments may use through hole style LEDs rather than surface mount. However, by using features of the present invention relating to the individual control there is no need to adjust the angle at which the through hole LEDs are aimed such as in prior embodiments. As such, all of the LEDs may be directed in a same orientation such that they are all aimed parallel to one another and not directly toward the location where a glass container will be positioned during a particular inspection.

Depending on the inspection tests being performed, different sized panels may be used. For instance, for analyzing a sidewall of glass containers using an area array camera, a representative panel may be 620-720 mm by 125-225 mm. For analyzing a base of a glass container, a representative panel may be 170-270 by 145-245 mm. For Alpha MNR code readings a panel may be 125-175 mm by 125-175 mm. For analyzing a sidewall using linescan camera, a representative panel may be 75-125 mm by 200-300 mm. For analyzing a base of glass container using a linescan camera, a representative panel may be 500-100 mm by 125-175 mm. These sizes are representative in nature and other size panels are contemplated and a panel identified above for one type of camera could be used with the other type of camera. Examples described herein with reference to FIGS. 5-31 were obtained using an area array camera simply for illustrative purposes, but as noted above, the invention is not limited to area array cameras.

A controller 135 is configured to control the power applied to each of the LEDs 134 individually to individually control the brightness of each of the LEDs, e.g., the brightness of one LED is not dependent on the brightness of other LEDs.

In one embodiment, the controller 135 controls the brightness of each of the LEDs based on a predetermined power table (also referred to as an initial power table) that has predetermined power values for each light source. The power table will illuminate the LEDs to generate a predetermined light pattern that corresponds to one or more inspections to be performed. A predetermined power value could include a value of zero such that the brightness of that particular LED (e.g. light source) emits no light. The predetermined power table may generate predetermined light patterns such as, for example, a completely lit panel, horizontal or vertical stripes, a shape that follows the contours of the container being inspected, circles, rectangles, or other patterns to provide improved highlighting of the container or particular defects for which the container is being inspected by a processor 137. The processor 137 and controller 135 could be a single component or separate components and can be remote from the panel 110.

With further reference to FIG. 3, the LED 134' located proximate the center of the panel 110 is aligned with the viewing axis of the camera 116. In this configuration, LEDs located proximate the periphery of the panel 110, such as LED 134", when illuminated at an identical brightness to the LED 134' proximate the center of the panel 110, will appear to the camera 116 to be dimmer than the LED 134' proximate the center of the panel 110. As will be further described below, individual LED brightness control allows the power supplied to individual ones of the light sources of the panel 110 to be calibrated such that the brightness of LEDs proximate the periphery of the panel 110, or otherwise further from the central axis of the camera (i.e. the axis of inspection), can be adjusted such that all of the LEDs appear to be the same brightness to the camera 116. This is particularly useful when the LEDs are not directly aimed at the location where the glass container will be positioned when the image is taken for a particular inspection.

Figure 4:
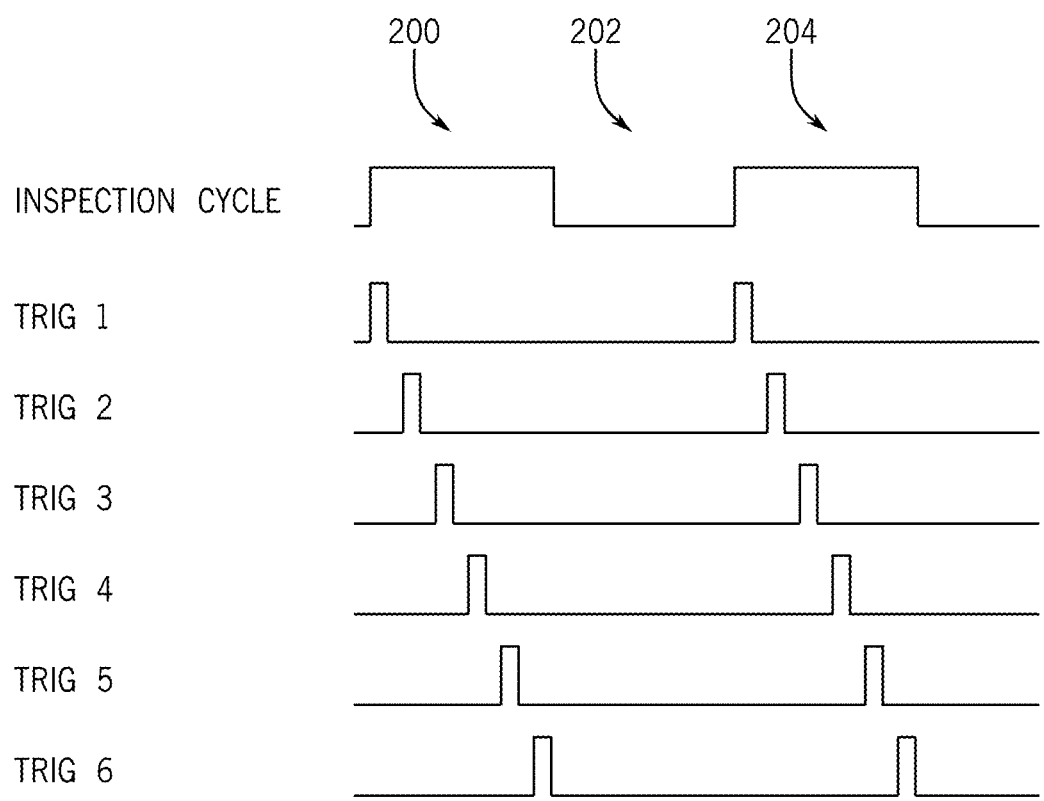
FIG. 4 is a timing graph showing timing of inspection of a glass container in the inspection stations of FIG. 2 according to an exemplary embodiment.

With reference to FIGS. 2 and 4, an exemplary timing diagram is illustrated. As shown, in one embodiment, the cycle includes a first portion 200 in which the light sources 110, 112, and 114 are sequentially triggered, a second portion 202 in which the container 102 is conveyed to the second station 106, and a third portion 204 in which the light sources 122, 124, and 126 are sequentially triggered. In one embodiment, the light sources 110, 112, 114, 122, 124, and 126 are each configured to illuminate in a different light pattern, for example, to conduct inspections for different types of defects in the container 102.

Figure 5:
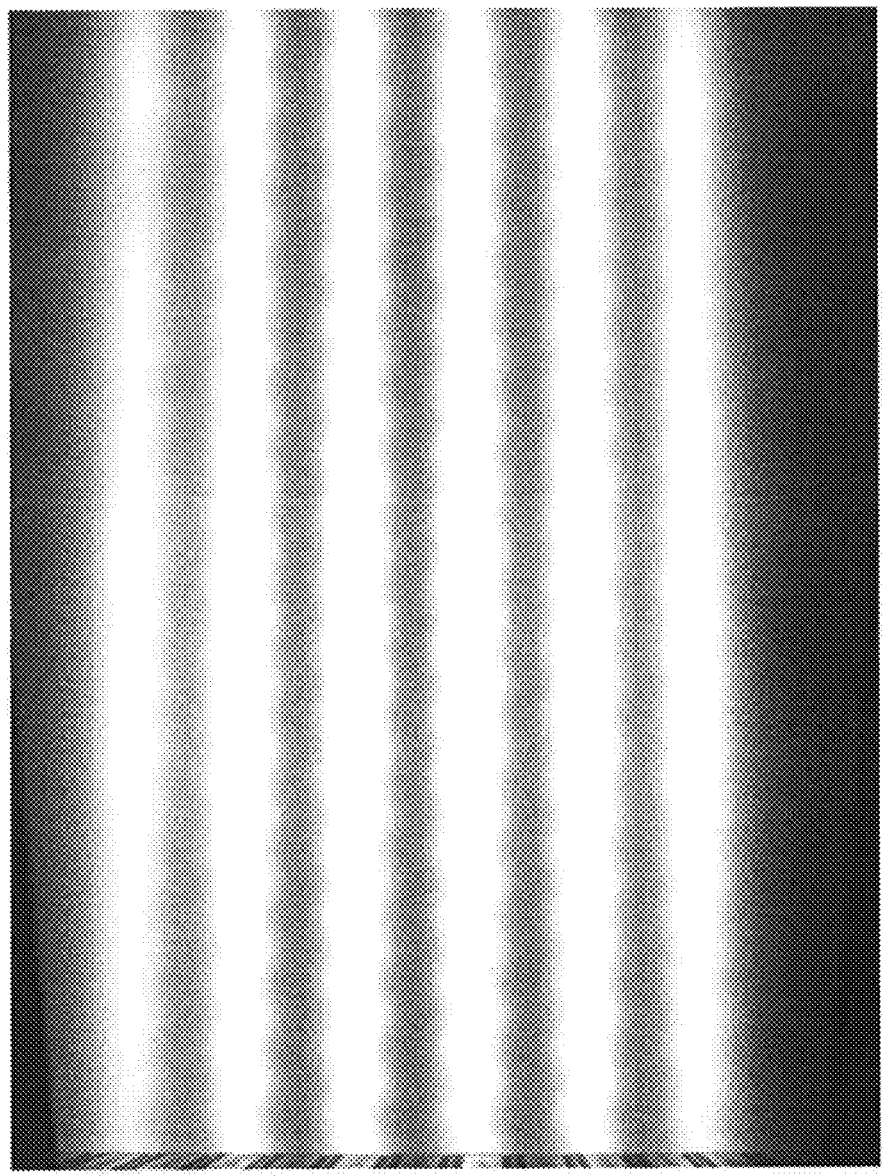
FIG. 5 is a camera image of a light panel of illuminated in a vertical column pattern according to an exemplary embodiment.
Figure 6:
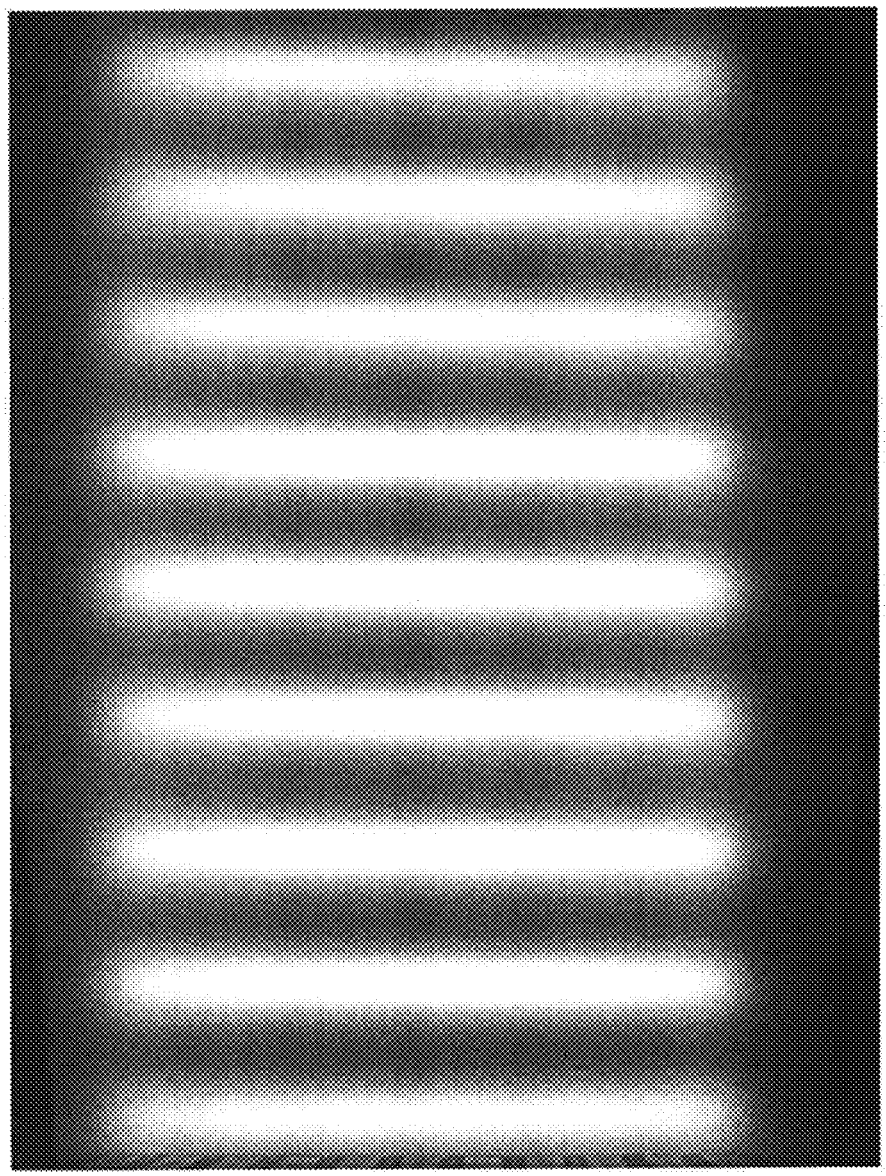
FIG. 6 is a camera image of the light panel of FIG. 5 illuminated in a horizontal row pattern according to an exemplary embodiment.
Figure 7:
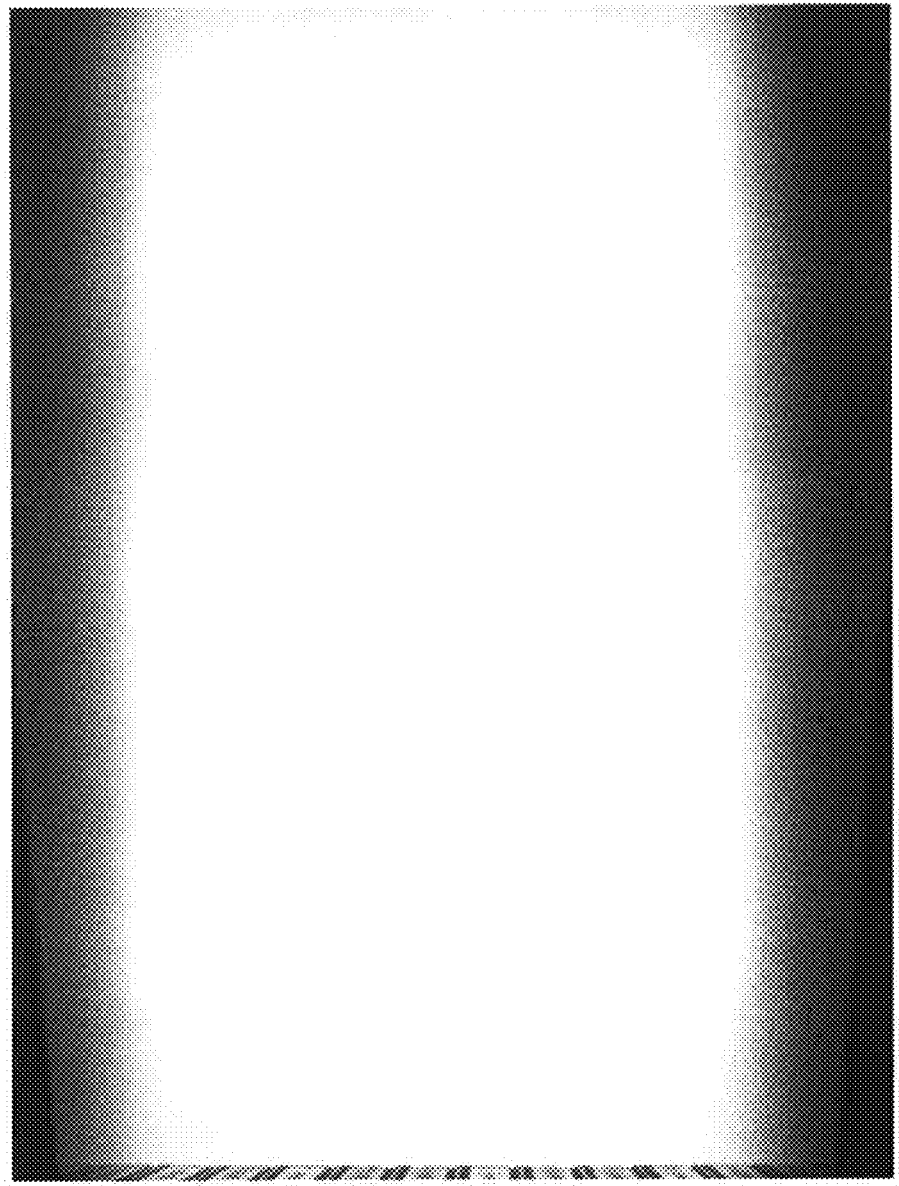
FIG. 7 is a camera image of the light panel of FIG. 5 with all of the LEDs illuminated according to an exemplary embodiment.
Figure 8:
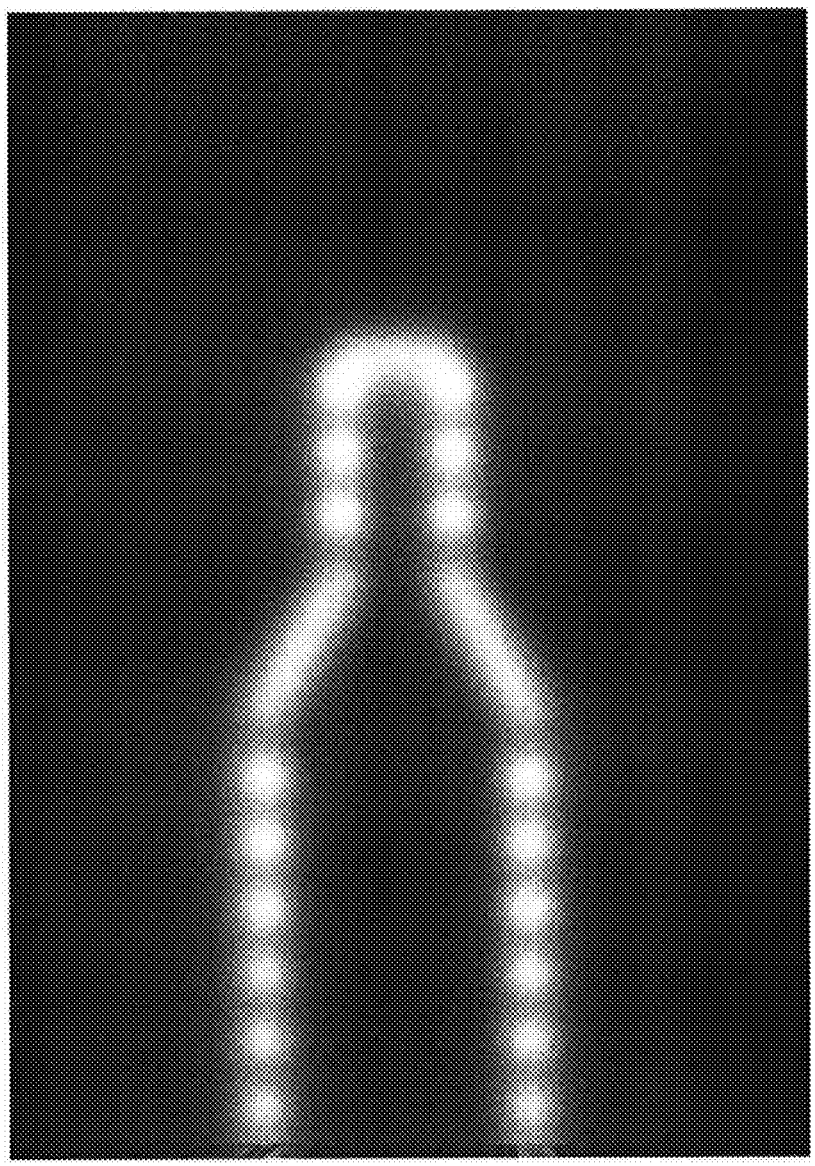
FIG. 8 is a camera image of the light panel of FIG. 5 illuminated in the shape of the outline of a bottle.
Figure 9:
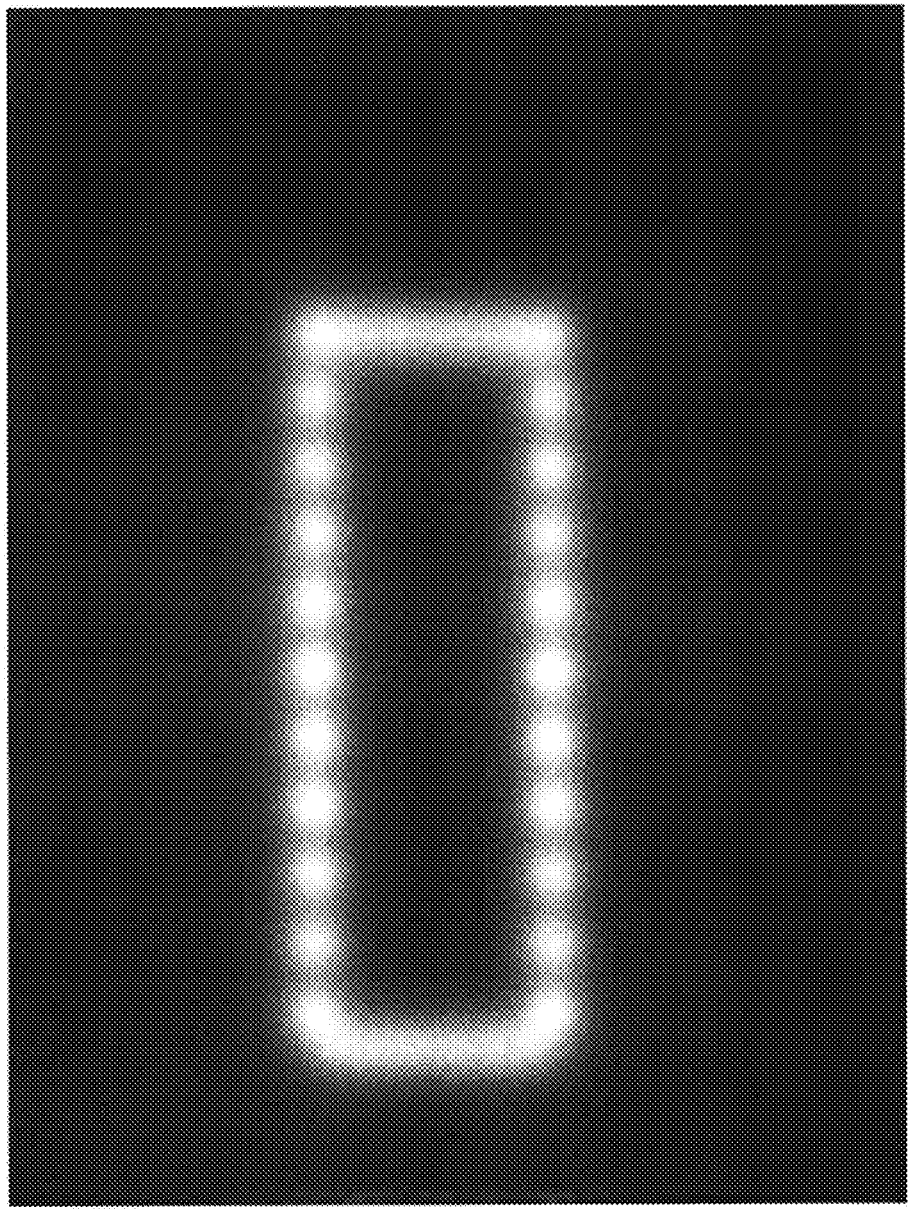
FIG. 9 is a camera image of the light panel of FIG. 5 illuminated in the shape of a rectangle according to an exemplary embodiment.
Figure 10:
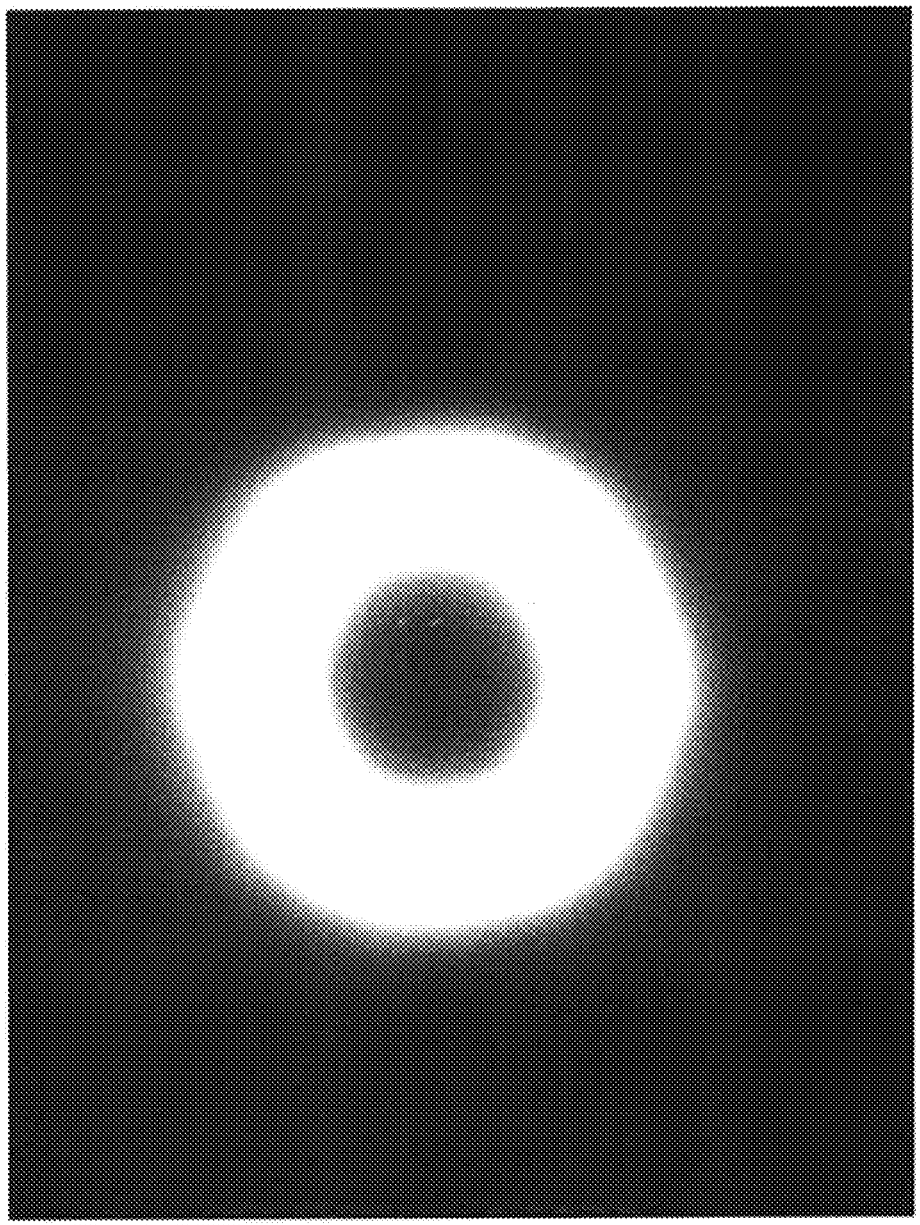
FIG. 10 is a camera image of the light panel of FIG. 5 illuminated in the shape of a circle according to an exemplary embodiment.

With reference to FIGS. 5 through 10, images of light panels such as those described above illuminated in different predetermined illumination patterns are illustrated. FIG. 5 is an image of a light panel illuminated in a pattern of vertical columns of light. FIG. 6 is an image of a light panel illuminated in a pattern of horizontal rows of light. FIG. 7 is an image of a light panel with all LEDs illuminated. FIG. 8 is an image of a light panel with LEDs illuminated in the shape of an outline of a bottle. FIG. 9 is an image of a light panel with LEDs illuminated in the shape of a rectangle. FIG. 10 is an image of a light panel with LEDs illuminated in the shape of a circle. A controller may be configured to automatically illuminate light panels in a predetermined pattern during an inspection cycle. This controller could be the same as controller 135 above or a separate controller.

Figure 11:
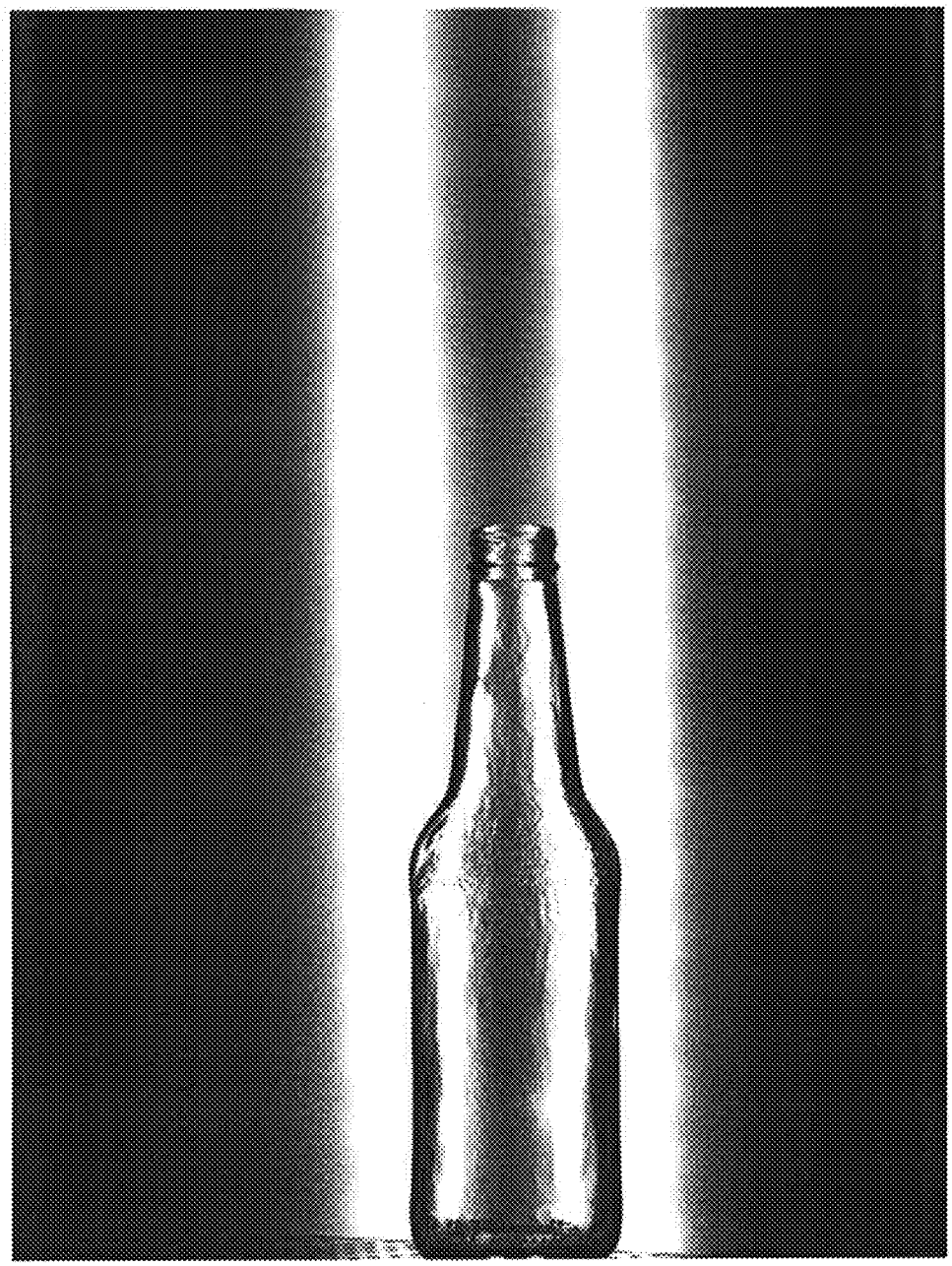
FIG. 11 is a camera image of a bottle in front of the light panel of FIG. 5 illuminated in a two column pattern configured to highlight the edges of the bottle.

With reference to FIG. 11, an image of a bottle being illuminated by a light panel illuminating in a two column pattern providing high contrast is illustrated. Each column is aligned with one of the sidewalls of the bottle, highlighting each of the sidewalls and allowing for edge detection, accurate dimension inspection, etc., by a processor processing the image of the bottle.

Figure 12:
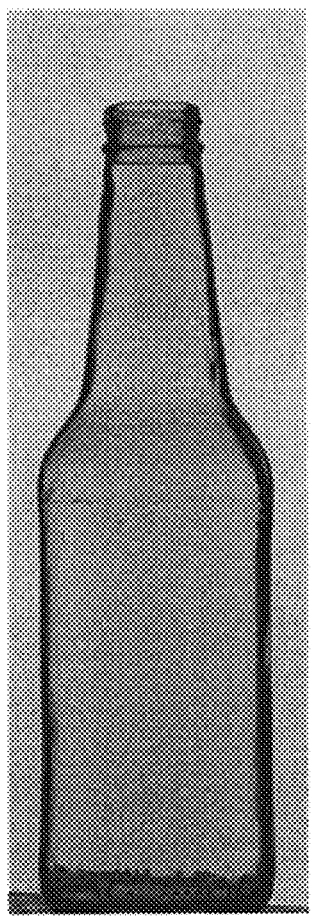
FIG. 12 is a camera image of a bottle illuminated by the light panel of FIG. 5 according to an exemplary embodiment.
Figure 13:
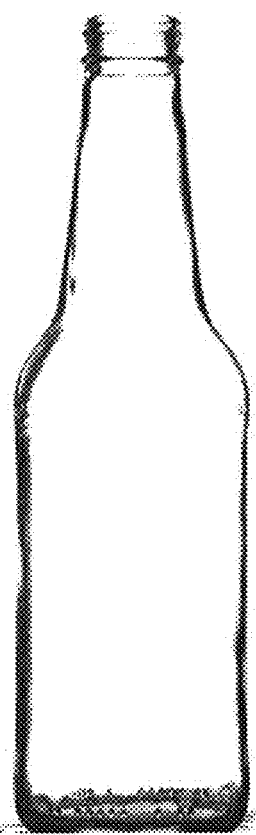
FIG. 13 is a camera image of the bottle of FIG. 12 illuminated by the light panel of FIG. 5 with the light panel illuminated more brightly than in FIG. 12 according to an exemplary embodiment.
Figure 14:
FIG. 14 is a camera image of the bottle of FIGS. 12 and 13 illuminated by the light panel of FIG. 5 with the light panel illuminated more brightly than in FIG. 12 but less brightly than in FIG. 13 according to an exemplary embodiment.

With reference to FIGS. 12-14, in one embodiment, the brightness of the LEDs of a panel, such as the panels described above, illuminating a bottle may be adjusted such that the image of the bottle is clear, well-lit, and configured for accurate analysis of the bottle by a processor processing the image. For example, the image of FIG. 12 may be too dark for analysis of some features of the bottle, and the image of FIG. 13 may be too bright for analysis of some features of the bottle. The brightness of the light panel is adjusted for the image of FIG. 14 such that the bottle is lit at a brightness at which features to be analyzed of the bottle can be accurately inspected or identified by a processor processing the image. In FIGS. 12-14, the panel is providing a uniform background which, depending on the brightness of the illumination, may be useful for inspecting glass containers for opaque defects such as inclusions.

The processor may be configured to evaluate the output from the camera to determine if the brightness detected in the field of view of the camera is above or below a predetermined threshold. If the brightness detected in the field of view of the camera is undesirably to high or too low depending on the test to be performed, the processor can generate an indication for the controller. This indication can be sent to and received by the controller that the brightness detected in the field of view is not desirable, the controller can adjust the amount of power supplied to one or more of the LEDs.

Figure 15:
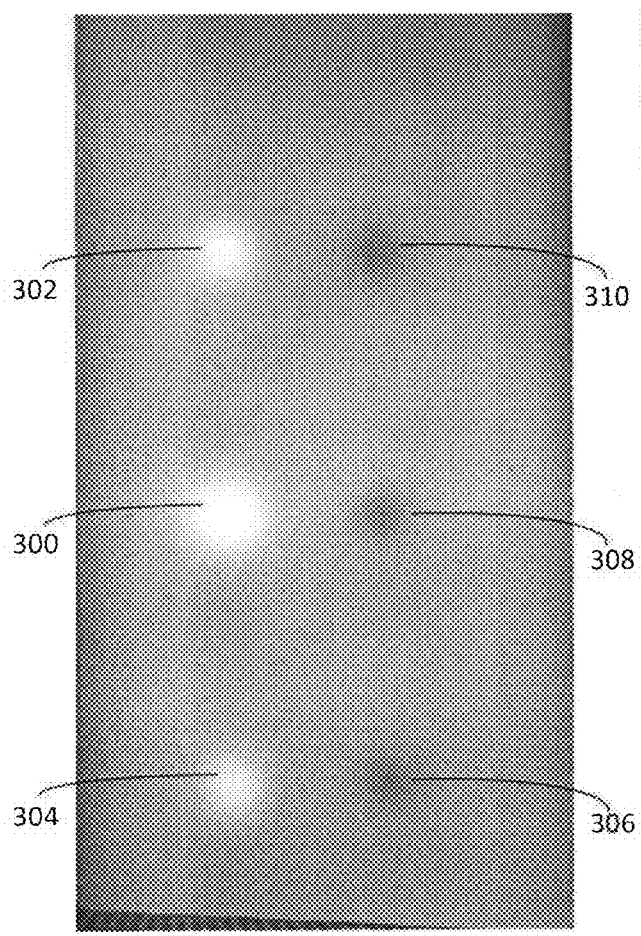
FIG. 15 is a camera image of the light panel of FIG. 5 with the LEDs unbalanced according to an exemplary embodiment.
Figure 16:
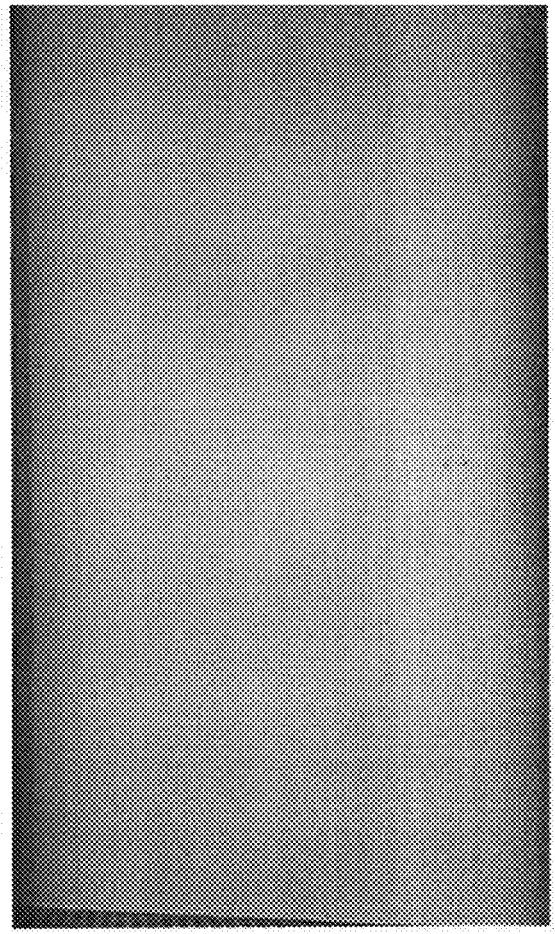
FIG. 16 is a camera image of the light panel of FIG. 5 with the LEDs balanced according to an exemplary embodiment.

With reference to FIGS. 15 and 16, an image of a light panel, such as those described above, is illustrated. In the image in FIG. 15, various LEDs 300, 302, 304, 306, 308, and 310 appear brighter and darker than other LEDs of the light panel to the camera taking the image. By individually adjusting the power provided to each LED, a uniformly lit image, shown in FIG. 16, may be provided, particularly as it relates to differences in the LEDs themselves.

Figure 17:
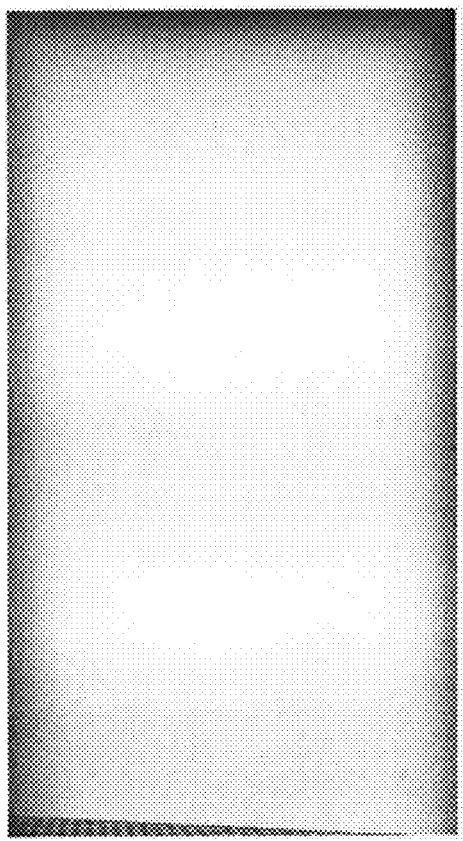
FIG. 17 is a camera image of the light panel of FIG. 5 with the LEDs unbalanced relative to the perspective of the camera according to an exemplary embodiment.
Figure 18:
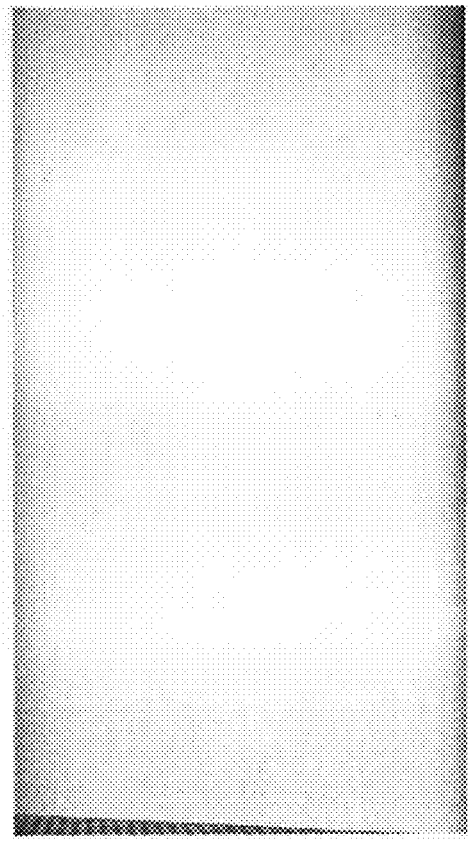
FIG. 18 is a camera image of the light panel of FIG. 5 with the LEDs balanced relative to the perspective of the camera according to an exemplary embodiment.
Figure 22:
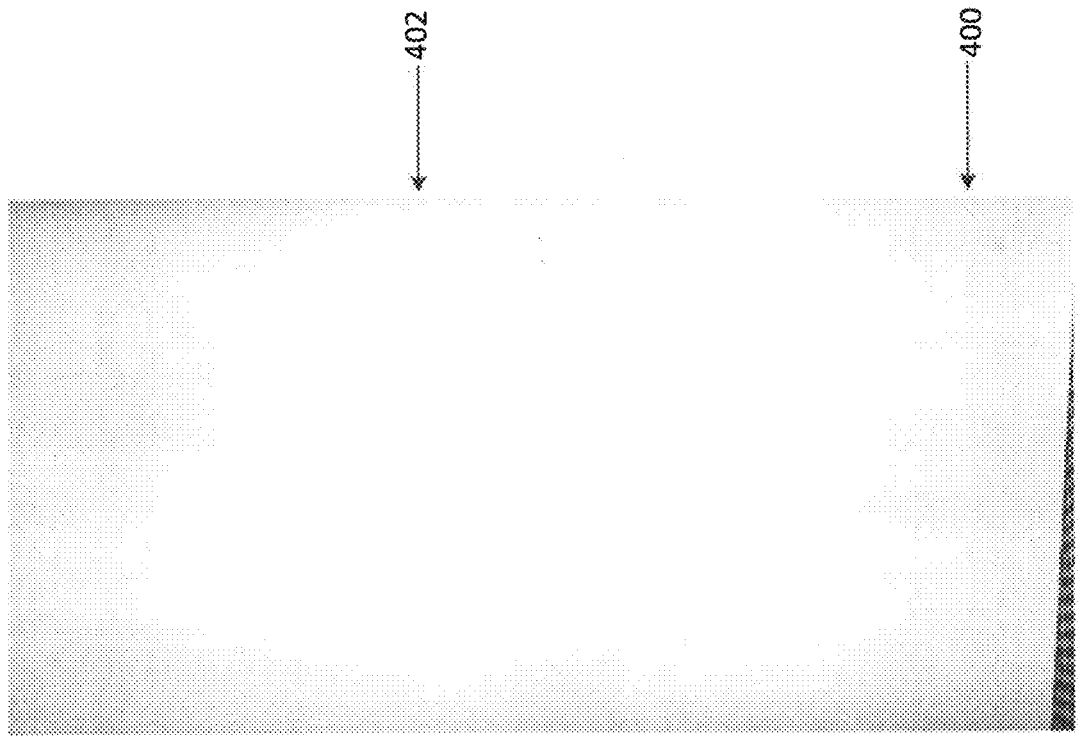
FIG. 22 is a camera image of the light panel of FIG. 21 with the lower LEDs illuminated more brightly than in FIG. 21 according to an exemplary embodiment.

With reference to FIG. 17, an image of a light panel such as those described above is lit with uniform power being provided to each of the LEDs of the light panel. As such, because of the camera's perspective, LEDs proximate the center of the light panel appear brighter in the image than LEDs proximate the periphery of the light panel. By individually controlling the power provided to each LED, flat field correction may be achieved, e.g., each of the LEDs may be illuminated at a brightness such that all of the LEDs appear as illuminating at a uniform brightness to the camera as shown in the image in FIG. 18. A calibration table specific to a particular light panel and configuration/orientation of the light panel relative to the inspection axis of the camera may be created, for example, by a controller adjusting the brightness of the individual LEDs. The calibration table may store the amount of power to be supplied to each individual LED to correct the individual LED's intensity to have an image of the camera that appears to the camera to be uniformly lit. The calibration table may be stored and later accessed by the controller. Additionally, in one embodiment, the controller may be configured to update the calibration table from time to time, e.g., as LEDs age and dim due to wear and/or debris, etc. The calibration tables and the brightness adjustment values e.g. power adjustment values) stored therein could be applied to predetermined power tables (e.g. initial power tables) identified previously that generate predetermined light patterns such that the power tables are adjusted to compensate for variations in the light sources of a given panel.

Adjustment of the power supplied to the light sources can compensate for an image being taken off of the central axis of the camera. The compensation improves the quality of the images of the glass containers dependent on the particular type of inspection being performed. Further, the compensation may merely be correcting for LEDs that have different brightness values than expected, debris, LEDs that have dimmed over time, etc.

With reference to FIGS. 19 and 20, contaminants, e.g., dust, etc., may from time to time come between a light panel, such as those described above, and an inspection camera, preventing some of the light from the light panel from reaching the inspection camera and causing the camera's image to be unacceptably lit. In one embodiment, an inspection system 100 (see FIG. 1) may include a controller configured to monitor the image of an inspection camera of the system 100. When an image of the inspection camera has a brightness (e.g. in overall intensity, individual illuminated shape, uniformity, etc.) that is outside of a predetermined inspection range, the controller is configured to individually adjust the brightness of individual LEDs of the light panel to bring the brightness of the image back within the predetermined acceptable brightness range. In one embodiment, the controller is also configured to monitor the image of an inspection camera of the system 100 to determine whether variation of brightness over the image is outside of a predetermined range. If the brightness variation falls outside of the predetermined range, the controller is configured to individually adjust the brightness of LEDs of the panel to bring the variation within the image back inside the predetermined range. FIG. 19 shows an image of a dusty LED panel with contaminants proximate a lower left corner illustrated generically at 320 obstructing some of the light from the panel from reaching the camera. FIG. 20 shows an image of the panel of FIG. 19 after the brightness of individual LEDs of the light panel has been adjusted to overcome the effects of the contaminants obstructing some of the light from the panel from reaching the camera.

Figure 21:
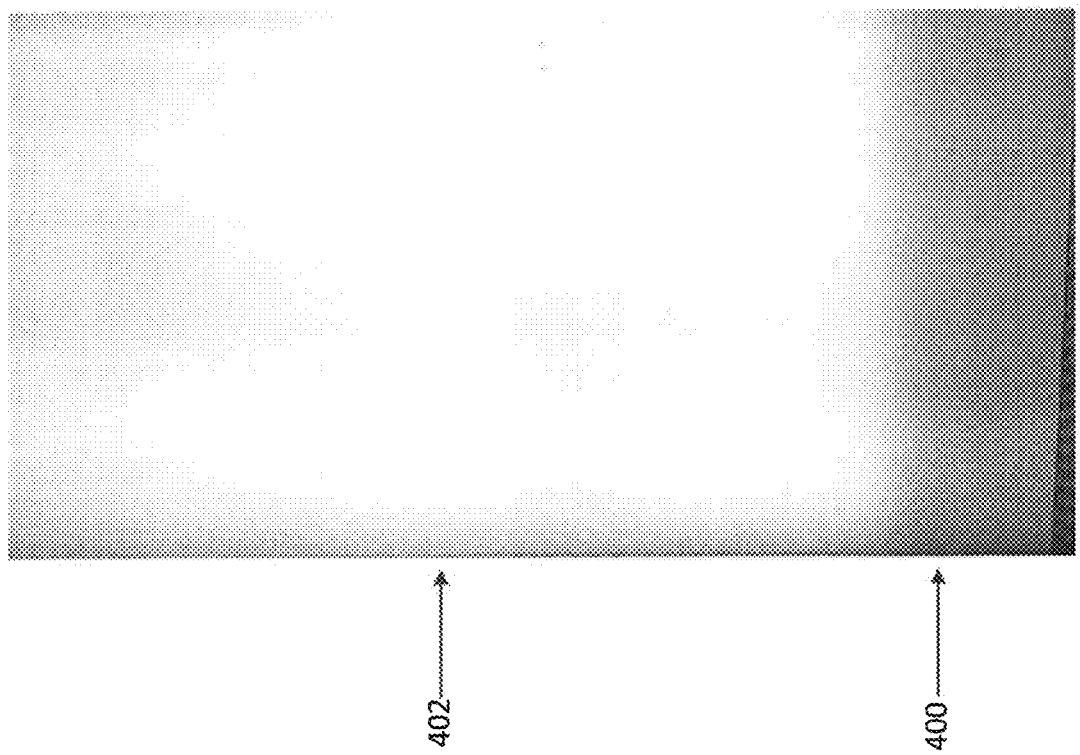
FIG. 21 is a camera image of a light panel with lower LEDs dimmer than upper LEDs according to an exemplary embodiment.
Figure 23:
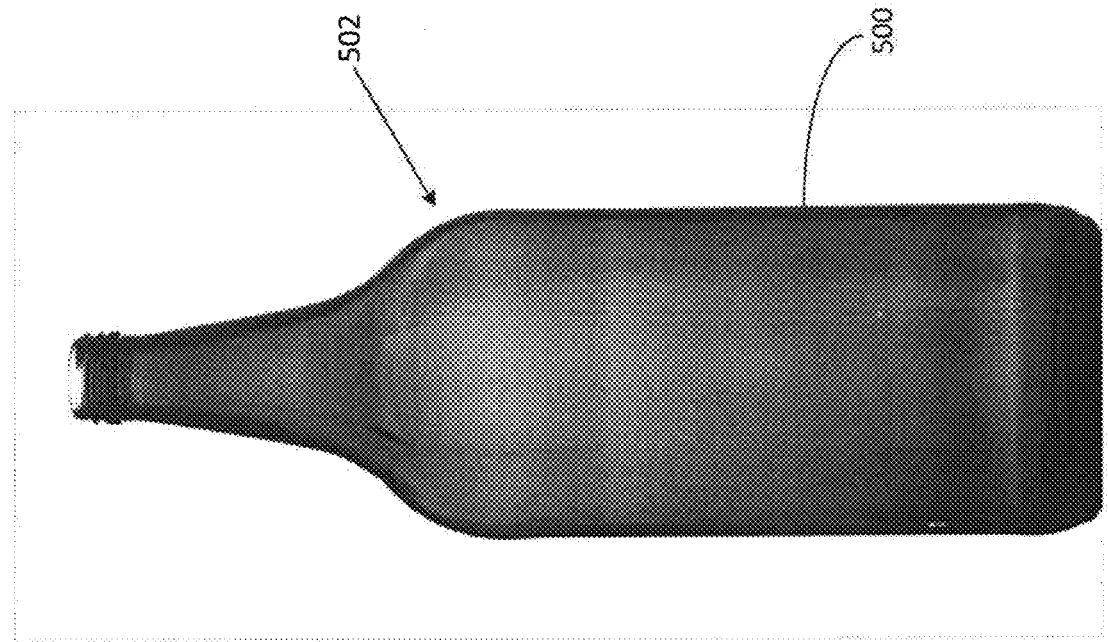
FIG. 23 is a camera image of the light panel of FIG. 5 illuminating a bottle according to an exemplary embodiment.

FIG. 21 illustrates an image of a light panel such as the light panels described above. In one embodiment, a portion of the LEDs, such as lower LEDs 400 on the board may provide a lower brightness of illumination for constant power over time than a different portion of the LED's, such as upper LEDs 402 causing a lower part of the image to appear darker than the upper part of the image. By individually controlling the amount of power supplied to the LEDs, the lower LEDs 400 can be brightened to provide more uniform lighting for the image of the camera. The variation in power supplied to the individual LEDs to provide the uniform lighting of FIG. 22 could be used to form a calibration table as discussed above. The calibration steps can be repeated over time such that the calibration table is updated for changes in the panel such as due to cleanliness of the panel or wear of the panel as discussed.

Figure 24:
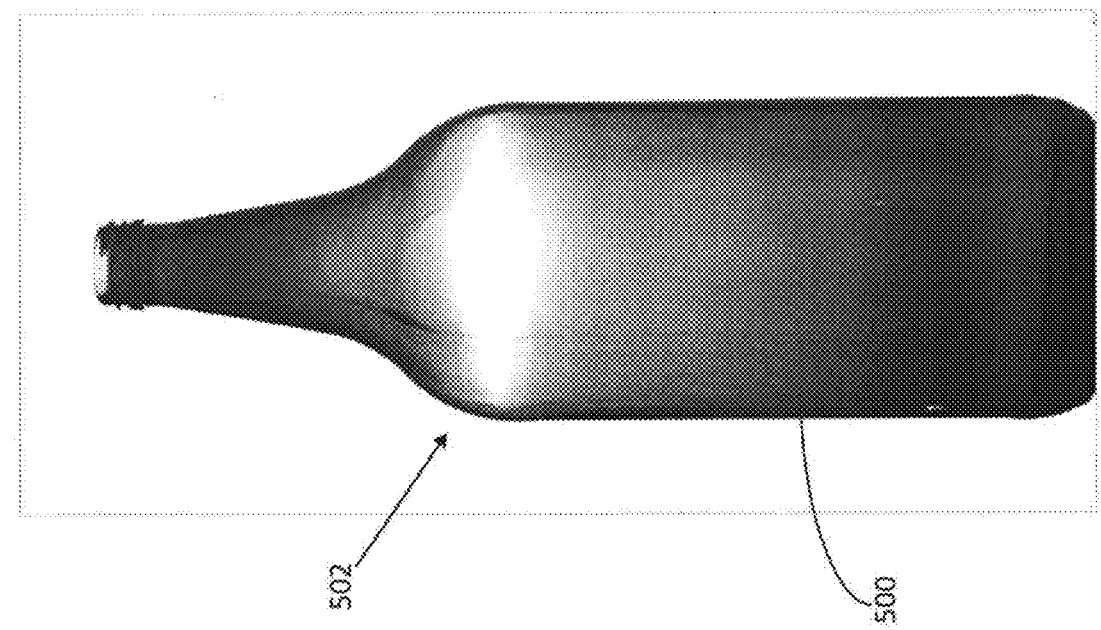
FIG. 24 is a camera image of the light panel illuminating the bottle of FIG. 23 with the brightness of the LEDs adjusted according to an exemplary embodiment.

In one embodiment, thicker portions of glass containers to be inspected may tend to absorb more light than thinner portions of glass containers. Some glass containers tend to have different thicknesses at different locations along the height of the containers. For example, some glass containers, such as the glass container 500 illustrated in FIG. 23, may tend to have thinner glass in the shoulder region 502. When the LEDs illuminating the glass container 500 are illuminated at the same brightness over all parts of the container 500, thinner portions of the glass container 500 may appear too bright in the image taken by the inspection camera, which may affect inspection of those regions by a processor inspecting the image. For instance, inclusions or defects in the shoulder region 502 may be washed out due to the brightness in illustrated in this region. However, the thicker regions of the container may need to be illuminated at that brightness in order for the image to be properly lit for inspection of those thicker regions. By individually adjusting the brightness of LEDs of a light panel (such as the light panels described above) illuminating the glass container 500, the portion of the light panel illuminating the shoulder region 502 may be illuminated at a lower brightness and the portions of the light panel illuminating the thicker regions of the bottle 500 may be illuminated at a higher brightness such that an image, as shown in FIG. 24, may appear to have a consistent brightness across the thinner portions and the thicker portions of the bottle, which may be desirable for inspection of the image for defects in the bottle.

Figure 25:
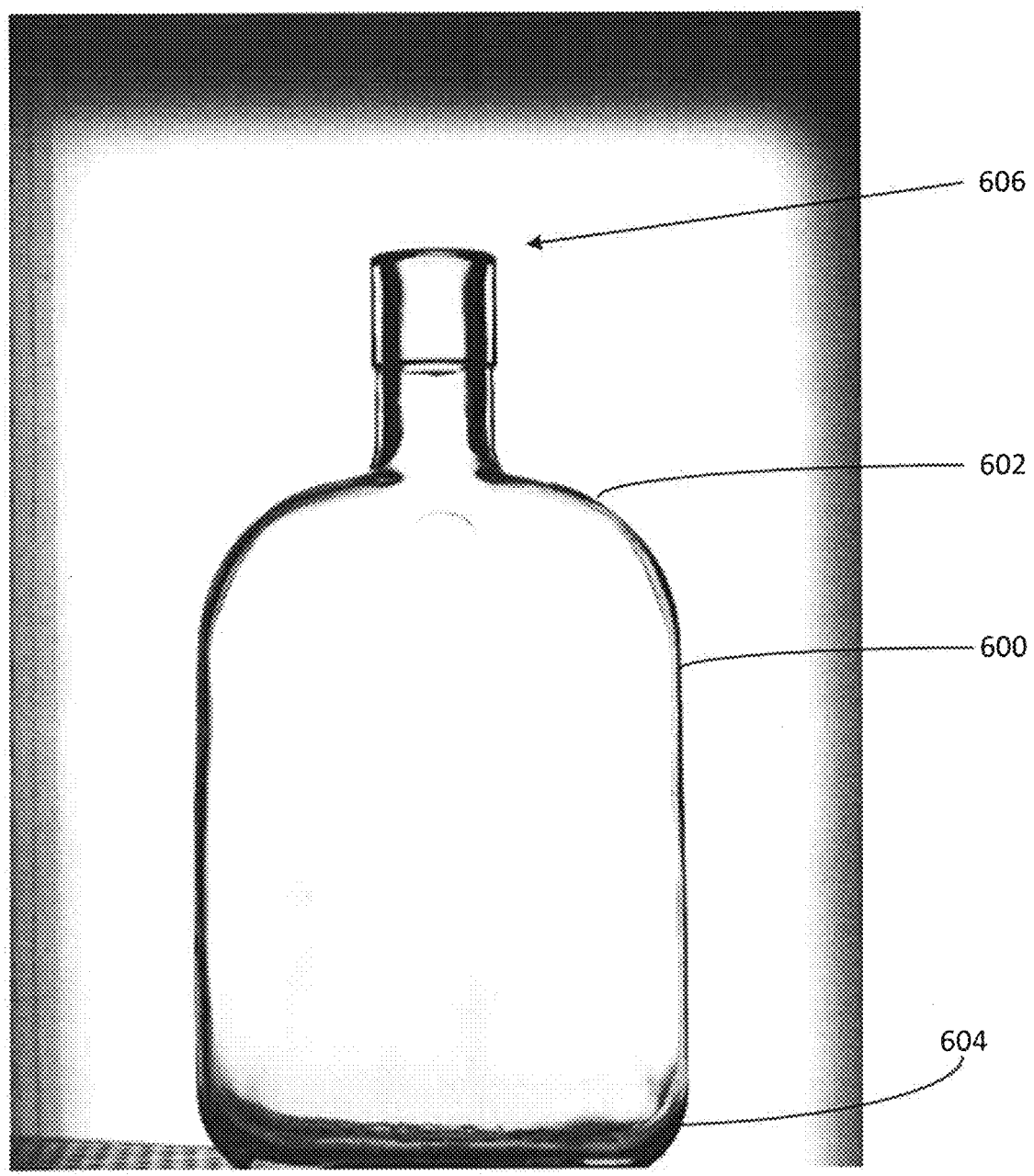
FIG. 25 is a camera image of the light panel of FIG. 5 illuminating a bottle according to an exemplary embodiment.

With reference to FIG. 25, some glass containers, such as the container 600, to be inspected have thicker portions, such as the shoulder 602 and heel 604 portions. A light panel, such as those described above, with individual LED brightness control may be used to illuminate the LEDs illuminating the shoulder and heel portions more brightly while illuminating the LEDs illuminating above the finish less brightly to obtain a uniformly lit image configured for dimensional inspection.

Figure 26:
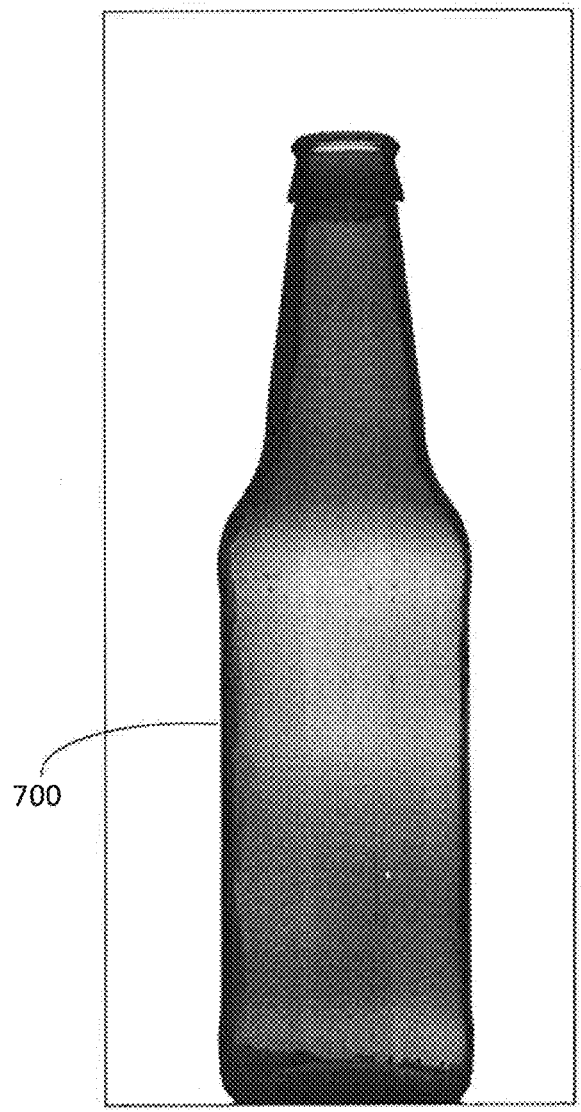
FIG. 26 is a camera image of the light panel of FIG. 5 illuminating a bottle.
Figure 27:
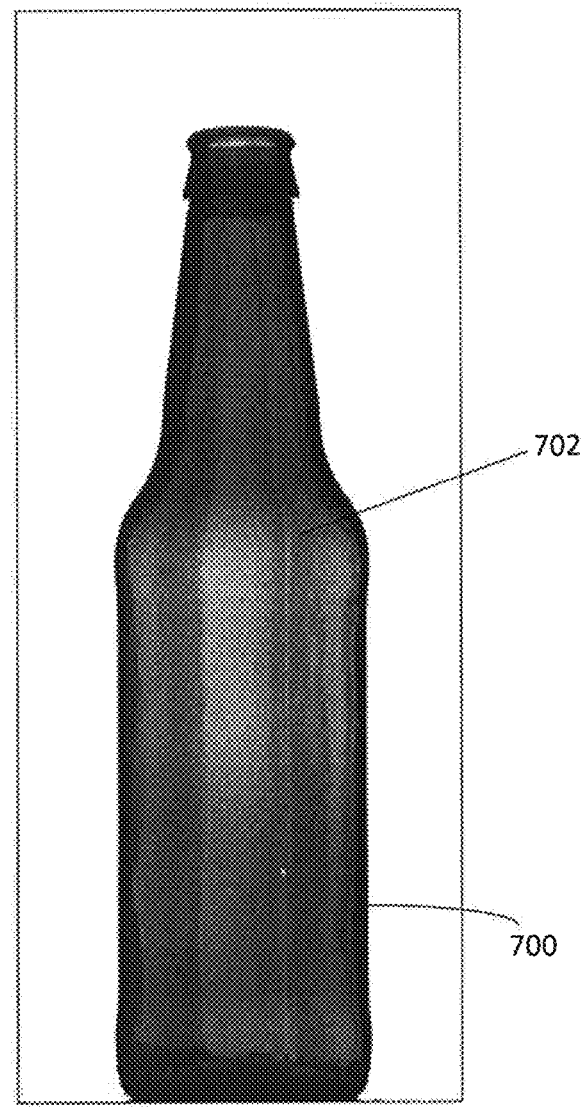
FIG. 27 is a camera image of the light panel illuminating the bottle of FIG. 26 with the brightness of some of the LEDs of the panel adjusted to enhance the seam of the bottle in the image according to an exemplary embodiment.

With reference to FIGS. 26 and 27, various different bottles to be inspected may have different features to be inspected, e.g., seams, embossing, etc. These different features may have different light absorption characteristics than other portions of the bottle. For example, the bottle 700 has a seam feature that absorbs less light than other portions of the sidewall of the bottle 700, resulting in an image shown in FIG. 26 in which the seam feature is washed out and cannot be inspected from the image. However, a light panel having individual LED brightness control may be used to reduce the brightness of LEDs illuminating the seam resulting in an image, shown in FIG. 27, in which the seam is visible and can be inspected.

Figure 28:
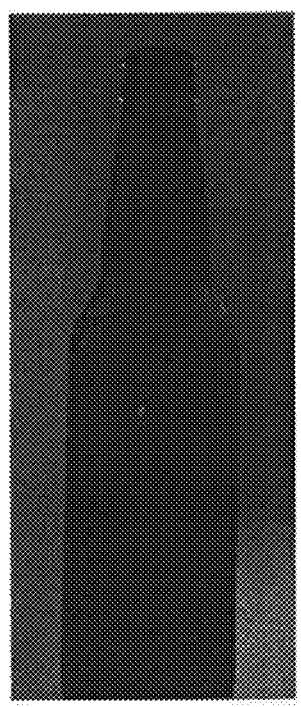
FIG. 28 is a camera image of the light panel of FIG. 5 illuminating a bottle.
Figure 29:
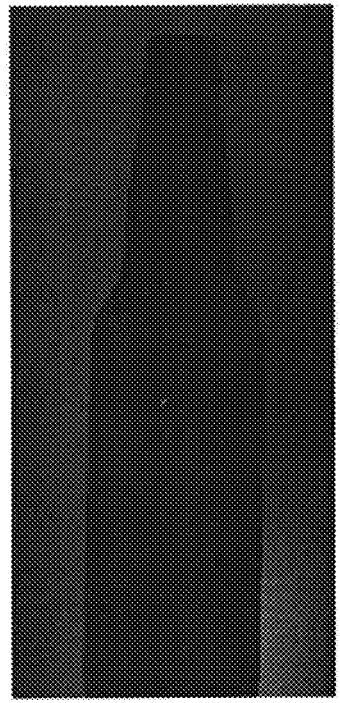
FIG. 29 is a camera image of the light panel illuminating the bottle of FIG. 28 with the brightness of the LEDs adjusted relative to FIG. 28.

With reference to FIGS. 28 and 29, stresses in the sidewall of containers may be inspected by backlighting a container with a bright, highly diffuse light source and a linear polarizer. A secondary cross polarizer is located between the container and the camera to detect stress defects. Using a brighter light source may provide a better signal for detecting stress defects. However, as the intensity of the light source is increased, additional stray reflections appear around the curved areas of the container, e.g. at the shoulders at the base of the neck of the illustrated container. An image of a stress inspection of a glass bottle is shown in FIG. 28. Using a light panel, such as those described above, with individual LED brightness control, the brightness of the LEDs can be adjusted such that the pattern of light illuminating the glass bottle can be shaped to follow the contour of the container to minimize surface reflections for stray light, as shown in FIG. 29, which may be desirable.

Figure 30:
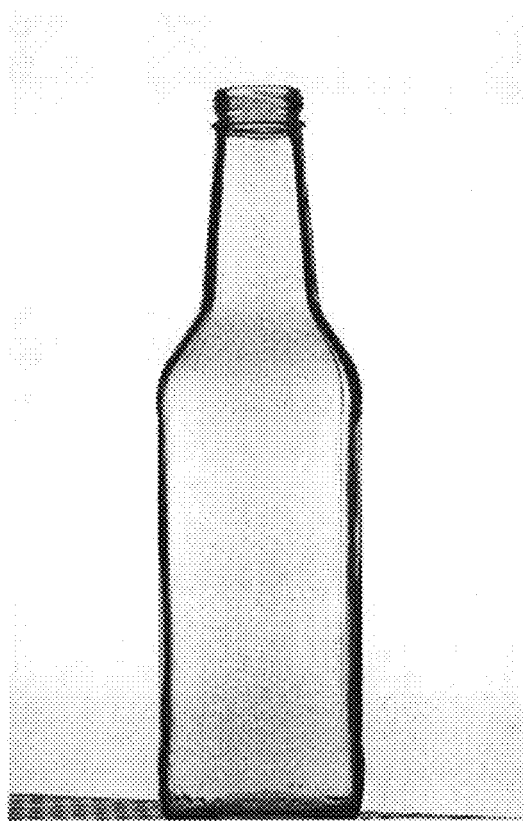
FIG. 30 is a camera image of the light panel of FIG. 5 illuminating a bottle.
Figure 31:
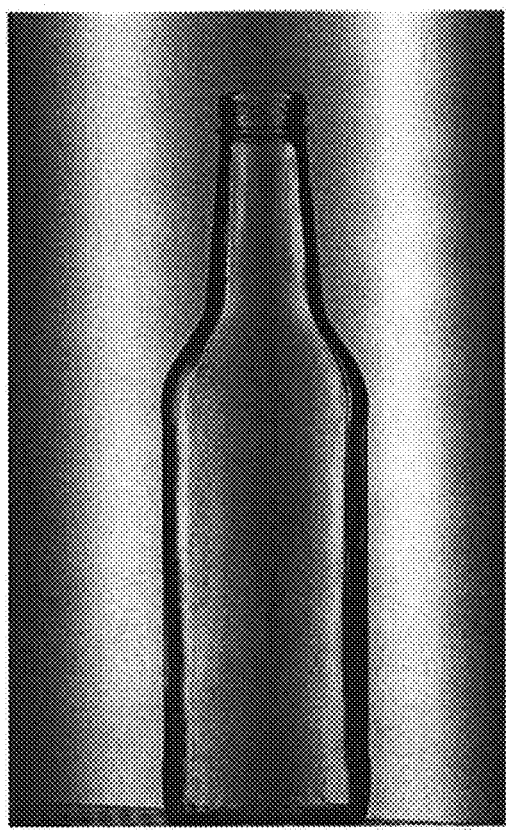
FIG. 31 is a camera image of the light panel of FIG. 30 with the brightness of some of the LEDs adjusted relative to FIG. 30 to enhance the edges of the bottle.

With reference to FIGS. 30 and 31, inspection of the dimensions of a container may be performed by uniformly backlighting a container, as shown in FIG. 30. However, using a light panel, such as those described above, with individual LED brightness control, the brightness of the LEDs can be adjusted such that the pattern of light illuminating the container following the contour of at least a portion of the container, as shown in FIG. 31, may enhance the clarity of the edges of the container in an image of the container, which may improve accuracy and repeatability of dimensional inspection. It can be seen when comparing FIG. 30 to FIG. 31 that the outer peripheral shape of the container is clearer in FIG. 31 than in FIG. 30.

Figure 32:
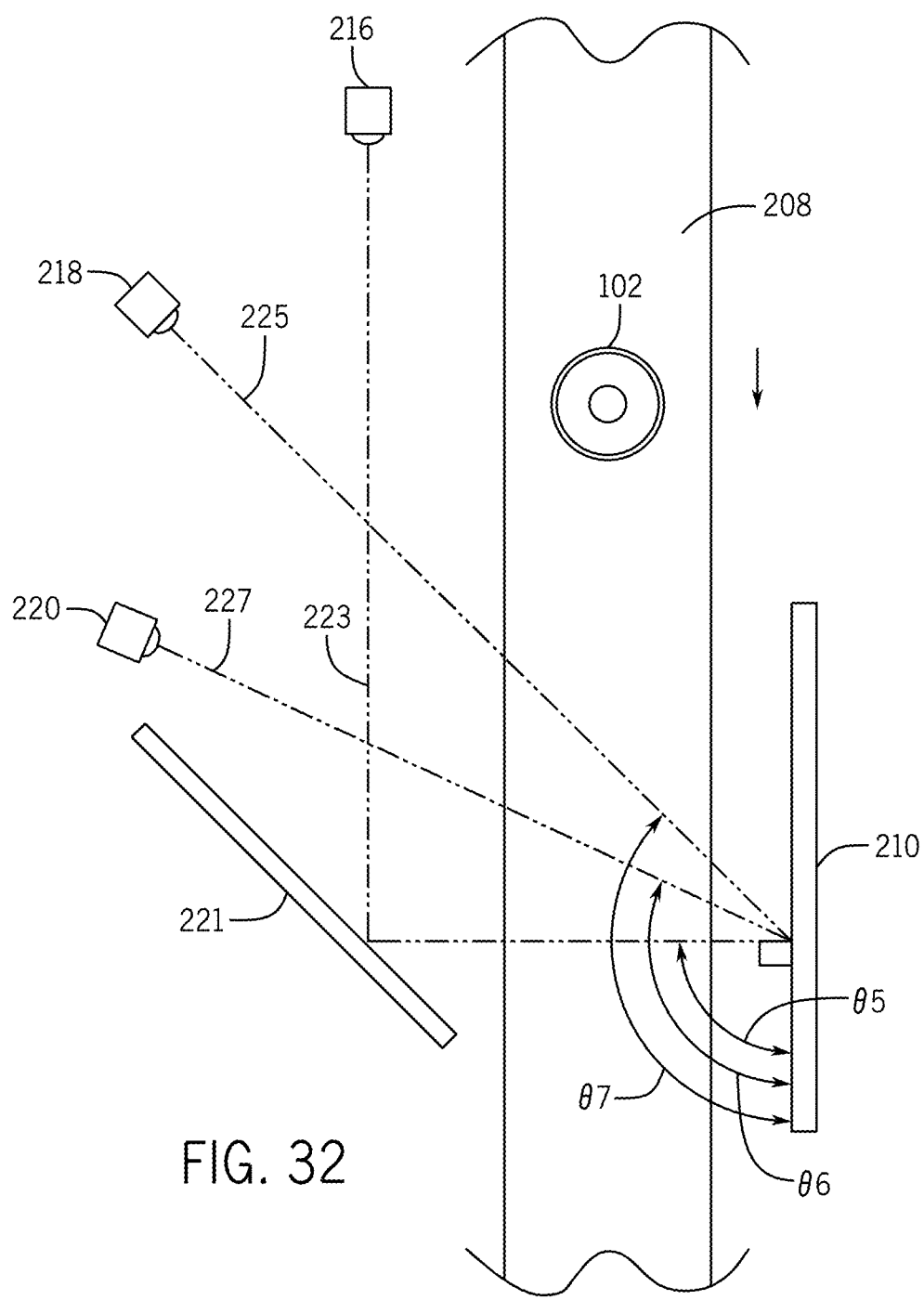
FIG. 32 schematically illustrates an alternative inspection station configuration of the glass container inspection system of FIG. 1 according to an exemplary embodiment.

FIG. 32 illustrates a further configuration of an inspection station 204 for use in inspection system 100. In this embodiment, panel 210 is planar and the inspection station 204 includes first, second and third cameras 216, 218 and 220 for inspecting a glass container 102 as it is conveyed by conveyor 208.

The axis of inspection 223 of the first camera 216 is reflected off of mirror 221 and ultimately is directed at angle θ5, which is a right angle relative to the illustrated panel 210 in this embodiment. The axes of inspection 225, 227 of the second camera 218 and third camera, respectively, are angled relative to the panel 210 at angles θ6 and θ7 that are greater than 90°. In this embodiment, angles θ6 and θ7 are 115° and 135°, respectively. However, other ranges are contemplated.

Typically, each of the first, second and third cameras 216, 218, 220 would be used to perform different inspections of the glass container. Various different types of inspections that may be used will be described later.

It is noted that the axes of inspection 225, 227 are not perpendicular to panel 210, which is planar in the illustrated embodiment.

In this configuration, a single planar panel is used with multiple cameras, namely, first, second and third cameras 216, 218 and 220.

When using multiple cameras or taking multiple images while using a same panel, such as the first, second and third cameras 216, 218, 220 with a single panel, such as panel 210, different sets of the plurality of light sources of the panel may be illuminated for different ones of the images being captured. More particularly, the panel 210 has a plurality of light sources. However, the controller may illuminate a first predetermined set of the plurality of light sources to illuminate the glass container with a first predetermined illumination pattern for a first inspection while a first image of the glass container is captured. The controller may then illuminate a second predetermined set of the plurality of light sources to illuminate the glass container with a second predetermined illumination pattern for a second inspection while a second image of the glass container is captured. The system can then analyze the images to determine if a defect exists in the glass container.

Typically, the different illumination patterns will be provided for different inspections such as, by way of non-limiting example, the various inspections described previously. For example in one embodiment, the first predetermined illumination pattern may be a uniform background for inspecting opaque defects while the second predetermined pattern may provide high contrast for illustrating the edges of the container for dimensional inspection.

These first and second images may be captured by a same camera or by a different camera depending on the system. Further, the types of cameras used with the panel could be different for the different images that are captures.

The calibration operations of the powering of the panel discussed above can be applied for each of the individual inspections to be performed using the panel.

The use of the individually controlled light sources provides for adjustment in the illumination of the light sources that further improves the adaptability and use of the inspection system 100.

For instance, if a single camera is used to take several images of a same container for several different inspections as discussed above, the container will likely not be located in the same exact position relative to the panel and the inspection axis of the camera when both images are captured. As such, one or more of the images may be taken when the container is not perfectly aligned on the inspection axis of the particular camera. However, it is possible to have the controller configured to power the plurality of light sources to illuminate the glass container for the image being taken with the container off-axis as if the image was captured while the glass container was located centered on the axis of inspection of the camera. This is particularly useful as multiple images of the same container are often taken to perform multiple inspections and the images will often be taken while the glass containers are moving through the inspection station on the corresponding conveyor of the inspection system.

In some embodiments, the first and second predetermined patterns will have corresponding predetermined power tables for properly powering the corresponding first and second sets of the light sources.

It is contemplated that a same calibration table generated for a particular panel could be used to adjust the power table for more than one of the power tables for the first and second predetermined patterns.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, values of parameters, arrangements, use of materials, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

In various embodiments, the processors and controllers described herein may include a general purpose processor, an application specific processor, a circuit containing one or more processing components, a group of distributed processing components, e.g., distributed computers configured for processing, etc. Embodiments of processors and controllers may be or include any number of components for conducting data processing and/or signal processing. According to an exemplary embodiment, any distributed and/or local memory device may be utilized with and/or included in the processors and controllers of this disclosure. In one embodiment, processors and controllers may include memory communicably connected to a processor or controller (e.g., via a circuit or other connection) and may include computer code for executing one or more processes described herein.

In various embodiments, the processors and controllers may be implemented in software. In another embodiment, the processors and controllers may be implemented in a combination of computer hardware and software. In various embodiments, systems implementing the processors and controllers discussed herein include one or more processing components, one or more computer memory components, and one or more communication components. In various embodiments, the processors and controllers may include a general purpose processor, an application specific processor (ASIC), a circuit containing one or more processing components, a group of distributed processing components, a group of distributed computers configured for processing, etc., configured to provide the functionality discussed herein. In various embodiments, the processors and controllers may include memory components such as one or more devices for storing data and/or computer code for completing and/or facilitating the various processes described in the present disclosure, and may include database components, object code components, script components, and/or any other type of information structure for supporting the various activities described in the present disclosure. In various embodiments, communication components, for example, for communication between processors, controllers, cameras, light panels, conveyors, etc., described herein may include hardware and software for communicating data for the system and methods discussed herein. For example, communication components may include, wires, jacks, interfaces, wireless communications hardware etc., for receiving and transmitting information as discussed herein. In various specific embodiments, the processors, controllers, and/or methods described herein, may be embodied in nontransitory, computer readable media, including instructions (e.g., computer coded) for providing the various functions and performing the various steps discussed herein. In various embodiments, the computer code may include object code, program code, compiled code, script code, executable code, instructions, programmed instructions, non-transitory programmed instructions, or any combination thereof. In other embodiments, processors and controllers described herein may be implemented by any other suitable method or mechanism.

What is claimed is:

1. A system for inspecting a glass container comprising:
a panel configured to illuminate the glass container, the panel including a first plurality of light sources directed parallel to one another;
a first camera configured to image the illuminated glass container;
a controller configured to adjust the amount of power supplied to each of the light sources individually; and
a processor configured to evaluate the image of the illuminated glass container for indications of defects in the container.

2. The system of claim 1, wherein each light source is one or more surface mounted LED.

3. The system of claim 1, wherein the panel is configured to illuminate the first plurality of light sources simultaneously, the processor is configured to evaluate an image of the panel, and the controller is configured to control the power supplied to each of the first plurality of light sources individually such that an image of the panel appears to be uniformly lit to the first camera.

4. The system of claim 1, wherein the processor is configured to evaluate an output from the first camera to determine if the brightness detected in a field of view of the first camera is below a predetermined threshold and to indicate to the controller when the brightness detected in a field of view of the first camera is below the predetermined threshold.

5. The system of claim 4, wherein the controller is configured to receive the indication that the brightness detected in a field of view of the first camera is below a predetermined threshold and to adjust the amount of power supplied to at least one of the first plurality of light sources until a desired brightness is detected.

6. The system of claim 1, wherein all of the light sources of the panel are directed in a same orientation.

7. The system of claim 1, wherein the light sources that are farther from the first camera are driven at a higher power than light sources that are closer to the first camera such that the brightness of the farther and closer light sources is the same as viewed by the first camera.

8. The system of claim 1, wherein the controller is configured to illuminate the light sources based on a plurality of predetermined patterns depending on a type of container inspection, each predetermined pattern having a corresponding power table; and
wherein the controller and processor are configured to test the brightness of the light sources to determine power adjustment values based on a captured image of the panel and the controller and processor are configured to adjust the power table for one or more of the predetermined patterns based on the power adjustment values.

9. The system of claim 1, wherein the image is captured when the glass container is off of a central axis of the first camera and the controller is configured to adjust the power of the first plurality of light sources as if the image was captured when the glass container was on the central axis of the first camera.

10. The system of claim 1, further including a second camera, an inspection axis of the first camera is offset from an inspection axis of the second camera.

11. The system of claim 1, wherein the panel is planar.

12. The system of claim 1, wherein the panel is formed from a plurality of planar segments including at least a first segment and a second segment that are non-parallel to one another, the first segment including the first plurality of light sources, the first plurality of light sources being orthogonal to the first planar segment, the second segment including a second plurality of light sources that are parallel to one another and orthogonal to the second segment.

13. A method of inspecting a glass container using a first panel including a first plurality of light sources, the method comprising:
    illuminating a first predetermined set of the first plurality of light sources to illuminate the glass container with a first predetermined illumination pattern;
    capturing a first image of the illuminated glass container;
    illuminating a second predetermined set of the first plurality of light sources to illuminate the glass container with a second predetermined illumination pattern, the second predetermined illumination pattern being different from the first predetermined illumination pattern;
    capturing a second image of the illuminated glass container; and
    evaluating the first and second images to determine whether the glass container includes a defect.

14. The method of claim 13, further comprising illuminating all of the first plurality of light sources, evaluating the brightness of the image viewed by a first camera, individually adjusting the amount of power supplied to at least one of the first plurality of light sources to provide uniform illumination from the view of the first camera.

15. The method of claim 13, further comprising continuing to evaluate the brightness of a field of view viewed by a first camera and increasing the amount of power supplied to at least one of the plurality of light sources if the brightness of the field of view viewed by the first camera drops below a predetermined threshold.

16. The method of claim 13, wherein the first image is captured by a first camera and the second image is captured by a second camera.

17. The method of claim 16, wherein an inspection axis of the first camera is offset from an inspection axis of the second camera.

18. The method of claim 13, wherein the first image is captured with the glass container located in a first location relative to the panel and the second image is captured with the glass container positioned in a second location relative to the panel, the second location being different than the first location.

19. The method of claim 18, wherein the first and second images are captured by a same camera.

20. The method of claim 18, wherein:
    illuminating a first predetermined set of the first plurality of light sources includes powering the first predetermined set of the first plurality of light sources based on a first predetermined power table;
    illuminating a second predetermined set of the first plurality of light sources includes powering the second set of the first plurality of light sources based on a second predetermined power table.

21. The method of claim 20, further including:
    analyzing the brightness of the first plurality of light sources and determining a brightness adjustment value for at least one of the first plurality of light sources;
    creating a calibration table that stores the brightness adjustment value for the at least one of first plurality of light sources; and
    adjusting the first and second predetermined power tables based on the calibration table.

22. The method of claim 13, wherein illuminating a first predetermined set of the first plurality of light sources includes powering the first predetermined set of the first plurality of light sources based on a first predetermined power table;
    further including:
    analyzing the brightness of the first predetermined set of first plurality of light sources and determining a brightness adjustment value for at least one of the light sources of the first predetermined set; and
    adjusting the first power table based on the brightness adjustment value for the at least one of the light sources of the first predetermined set.

23. The method of claim 13, wherein the first and second predetermined illumination patterns are selected from one of a plurality of horizontal bands of light; a plurality of vertical bands of light; a uniform continuous light; a shape that follows the contour of the glass container; and a circle.

* * * * *